(12) United States Patent
Gish et al.

(10) Patent No.: US 10,937,116 B2
(45) Date of Patent: *Mar. 2, 2021

(54) POWER EFFICIENT DETECTION OF WATERMARKS IN MEDIA SIGNALS

(71) Applicant: The Nielsen Company (US), LLC, New York, NY (US)

(72) Inventors: David Gish, Riverdale, NJ (US); Sadhana Gupta, Columbia, MD (US); Vladimir Kuznetsov, Ellicott City, MD (US); Wendell D. Lynch, East Lansing, MI (US); Alan R. Neuhauser, Silver Spring, MD (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,216

(22) Filed: Feb. 9, 2018

(65) Prior Publication Data

US 2018/0165784 A1 Jun. 14, 2018

Related U.S. Application Data

(63) Continuation of application No. 15/495,584, filed on Apr. 24, 2017, now Pat. No. 9,904,968, which is a
(Continued)

(51) Int. Cl.
*G06K 9/00* (2006.01)
*G06T 1/00* (2006.01)
(Continued)

(52) U.S. Cl.
CPC ........... *G06T 1/0021* (2013.01); *H04N 19/42* (2014.11); *H04N 19/467* (2014.11);
(Continued)

(58) Field of Classification Search
CPC ............... G06T 1/0021; G06T 2200/28; G06T 2201/0065; H04N 19/42; H04N 19/467;
(Continued)

(56) References Cited

U.S. PATENT DOCUMENTS 5,450,490 A 9/1995 Jensen et al.
5,481,294 A 1/1996 Thomas et al.
(Continued)

FOREIGN PATENT DOCUMENTS

CN 102074240 5/2011
CN 102265344 11/2011
(Continued)

OTHER PUBLICATIONS

United States Patent and Trademark Office, "Notice of Allowance", mailed in connection with U.S. Appl. No. 14/587,995 dated Jan. 21, 2016 (12 pages).
(Continued)

*Primary Examiner* — Avinash Yentrapati
(74) *Attorney, Agent, or Firm* — Hanley, Flight & Zimmerman, LLC

(57) ABSTRACT

Methods, apparatus, systems and articles of manufacture (e.g., physical storage media) to implement power efficient detection of watermarks in media signals are disclosed. Example metering apparatus disclosed herein include detector means for detecting watermarks in a media signal. Disclosed example metering apparatus also include controller means for operating the detector means to (1) detect a first watermark in the media signal, and (2) cycle between sleep intervals and active intervals to detect a second watermark at a second location in the media signal relative to a first location of the first watermark in the media signal after the first watermark has been verified.

17 Claims, 14 Drawing Sheets

Related U.S. Application Data continuation of application No. 15/231,439, filed on Aug. 8, 2016, now Pat. No. 9,641,857, which is a continuation of application No. 14/587,995, filed on Dec. 31, 2014, now Pat. No. 9,418,395.

(51) Int. Cl.

| | | |
|---|---|---|
| H04N 21/443 | (2011.01) | |
| H04N 21/439 | (2011.01) | |
| H04N 21/8358 | (2011.01) | |
| H04N 19/467 | (2014.01) | |
| H04N 19/42 | (2014.01) | |

(52) U.S. Cl.
CPC ..... *H04N 21/4394* (2013.01); *H04N 21/4436* (2013.01); *H04N 21/8358* (2013.01); *G06T 2200/28* (2013.01); *G06T 2201/0065* (2013.01)

(58) Field of Classification Search
CPC ........... H04N 21/4394; H04N 21/4436; H04N 21/8358
See application file for complete search history.

(56) References Cited

U.S. PATENT DOCUMENTS

| | | | |
|---|---|---|---|
| 5,574,962 A | 11/1996 | Fardeau et al. | |
| 5,581,800 A | 12/1996 | Fardeau et al. | |
| 5,764,763 A | 6/1998 | Jensen et al. | |
| 5,787,334 A | 7/1998 | Fardeau et al. | |
| 5,940,135 A | 8/1999 | Petrovic et al. | |
| 6,345,100 B1* | 2/2002 | Levine | G06T 1/005 375/E7.018 |
| 6,697,103 B1 | 2/2004 | Fernandez et al. | |
| 6,871,180 B1 | 3/2005 | Neuhauser et al. | |
| 6,970,698 B2 | 11/2005 | Majmundar et al. | |
| 7,321,787 B2 | 1/2008 | Kim | |
| 7,369,677 B2* | 5/2008 | Petrovic | H04L 9/002 382/100 |
| 8,037,311 B2 | 10/2011 | Johnson et al. | |
| 8,055,505 B2 | 11/2011 | Tachibana et al. | |
| 8,103,049 B2 | 1/2012 | Petrovic et al. | |
| 8,359,205 B2 | 1/2013 | Srinivasan et al. | |
| 8,369,972 B2 | 2/2013 | Topchy et al. | |
| 8,539,527 B2 | 9/2013 | Wright et al. | |
| 8,924,994 B2* | 12/2014 | Conklin | H04H 60/32 725/14 |
| 9,602,891 B2* | 3/2017 | Winograd | H04N 21/4622 |
| 9,740,373 B2* | 8/2017 | Levy | G06F 21/10 |
| 9,852,736 B2* | 12/2017 | Sharma | G10L 19/018 |
| 9,891,883 B2* | 2/2018 | Sharma | G06F 3/165 |
| 10,147,433 B1* | 12/2018 | Bradley | G10L 19/018 |
| 2003/0083098 A1* | 5/2003 | Yamazaki | G06T 1/0064 455/556.1 |
| 2004/0128514 A1 | 7/2004 | Rhoads | |
| 2005/0177332 A1* | 8/2005 | Lemma | G10L 19/018 702/106 |
| 2005/0259820 A1* | 11/2005 | Jones | H04N 19/467 380/201 |
| 2006/0013565 A1* | 1/2006 | Baumgartner | H04N 21/44008 386/201 |
| 2007/0093943 A1 | 4/2007 | Nelson et al. | |
| 2007/0239503 A1* | 10/2007 | Bhatnagar | G06Q 10/06311 705/7.26 |
| 2008/0049971 A1* | 2/2008 | Ramos | G06F 16/44 382/100 |
| 2008/0052516 A1* | 2/2008 | Tachibana | G06F 16/40 713/176 |
| 2008/0232363 A1* | 9/2008 | Wang | H04L 63/0428 370/389 |
| 2009/0055854 A1 | 2/2009 | Wright et al. | |
| 2009/0074242 A1* | 3/2009 | Yamamoto | H04N 21/23892 382/100 |
| 2009/0123020 A1 | 5/2009 | Baudry et al. | |
| 2009/0300669 A1 | 12/2009 | Wright et al. | |
| 2010/0223062 A1 | 9/2010 | Srinivasan et al. | |
| 2010/0228857 A1 | 9/2010 | Petrovic et al. | |
| 2011/0144998 A1* | 6/2011 | Grill | H04N 1/32154 704/270 |
| 2011/0286625 A1* | 11/2011 | Petrovic | G10L 19/018 382/100 |
| 2012/0311620 A1* | 12/2012 | Conklin | H04N 21/442 725/14 |
| 2013/0086466 A1* | 4/2013 | Levy | G06F 21/10 715/234 |
| 2013/0152139 A1* | 6/2013 | Davis | H04H 60/61 725/61 |
| 2014/0013374 A1* | 1/2014 | Oh | G06T 1/0042 725/112 |
| 2014/0023226 A1 | 1/2014 | Sharma | |
| 2014/0047475 A1 | 2/2014 | Oh et al. | |
| 2014/0088742 A1 | 3/2014 | Srinivasan et al. | |
| 2014/0237628 A1 | 8/2014 | Petrovic | |
| 2016/0057317 A1* | 2/2016 | Zhao | H04N 21/00 348/515 |
| 2016/0293172 A1* | 10/2016 | Sharma | G10L 19/02 |
| 2017/0193628 A1* | 7/2017 | Sharma | G06T 3/0056 |
| 2017/0228848 A1 | 8/2017 | Gish et al. | |

FOREIGN PATENT DOCUMENTS

| | | |
|---|---|---|
| CN | 104137557 | 11/2014 |
| WO | 2006014344 | 2/2006 |

OTHER PUBLICATIONS

United States Patent and Trademark Office, "Notice of Allowability", mailed in connection with U.S. Appl. No. 14/587,995 dated May 4, 2016 (7 pages).

United States Patent and Trademark Office, "Notice of Allowability", mailed in connection with U.S. Appl. No. 14/587,995 dated Jul. 12, 2016 (7 pages).

International Searching Authority, "International Search Report and Written Opinion", mailed in connection with International Patent Application No. PCT/US2015/067693 dated May 3, 2016 (12 pages).

United States Patent and Trademark Office, "Notice of Allowance", mailed in connection with U.S. Appl. No. 15/231,439 dated Dec. 22, 2016 (10 pages).

United States Patent and Trademark Office, "Notice of Allowability", mailed in connection with U.S. Appl. No. 15/495,584 dated Jan. 30, 2018 (8 pages).

United States Patent and Trademark Office, "Notice of Allowance", mailed in connection with U.S. Appl. No. 15/495,584, dated Oct. 10, 2017 (11 pages).

United States Patent and Trademark Office, "Non-final Office Action", mailed in connection with U.S. Appl. No. 15/495,584 dated Oct. Jun. 2, 2017 (9 pages).

China National Intellectual Property Administration, "First Notification of Office Action," mailed in connection with Chinese Patent Application No. 201580071908.4, dated May 30, 2019, 13 pages.

European Patent Office, "Communication under Rule 71(3) EPC," mailed in connection with European Patent Application No. 15876106.4, dated Apr. 23, 2019, 68 pages.

European Patent Office, "Extended European Search Report," mailed in connection with European Patent Application No. 19195530.1, dated Oct. 28, 2019, 8 pages.

China National Intellectual Property Administration, "Notice of Completion of Formalities for Patent Registration," mailed in connection with Chinese Patent Application No. 201580071908.4, dated Jan. 16, 2020, 5 pages.

European Patent Office, "Extended European Search Report," mailed in connection with European Patent Application No. 15876106.4, dated Jun. 19, 2018, 8 pages.

\* cited by examiner

POWER EFFICIENT DETECTION OF WATERMARKS IN MEDIA SIGNALS

RELATED APPLICATION(S)

This patent arises from a continuation of U.S. patent application Ser. No. 15/495,584 (now U.S. Pat. No. 9,904, 968), entitled "POWER EFFICIENT DETECTION OF WATERMARKS IN MEDIA SIGNALS," which was filed on Apr. 24, 2017, which is a continuation of U.S. patent application Ser. No. 15/231,439 (now U.S. Pat. No. 9,641, 857), entitled "POWER EFFICIENT DETECTION OF WATERMARKS IN MEDIA SIGNALS," which was filed on Aug. 8, 2016, which is a continuation of U.S. patent application Ser. No. 14/587,995 (now U.S. Pat. No. 9,418, 395), entitled "POWER EFFICIENT DETECTION OF WATERMARKS IN MEDIA SIGNALS," which was filed on Dec. 31, 2014. Priority to each of U.S. patent application Ser. Nos. 14/587,995, 15/231,439 and 15/495,584 is hereby claimed. U.S. patent application Ser. Nos. 14/587,995, 15/231,439 and 15/495,584 are hereby incorporated by reference in their respective entireties.

FIELD OF THE DISCLOSURE

This disclosure relates generally to media watermarking and, more particularly, to power efficient detection of watermarks in media signals.

BACKGROUND

Watermarks can be embedded or otherwise included in media to enable additional information to be conveyed with the media. For example, audio watermarks can be embedded or otherwise included in the audio data/signal portion of a media stream, file and/or signal to convey data, such as media identification information, copyright protection information, etc., with the media. Such watermarks enable monitoring of the distribution and/or use of media, such as by detecting watermarks present in television broadcasts, radio broadcasts, streamed multimedia, etc., to identify the particular media being presented to viewers, listeners, users, etc. Such information can be valuable to advertisers, content providers, and the like.

Prior media monitoring systems employing watermarks typically include watermark decoders that run in a continuous fashion to ensure detection of the embedded watermarks in the monitored media signals. However, continuous operation of a watermark decoder can be undesirable in a portable meter. For example, such operation can quickly consume the available power of the portable meter and, thus, reduce the amount of time the portable meter is able to perform media monitoring.

Figure 1:
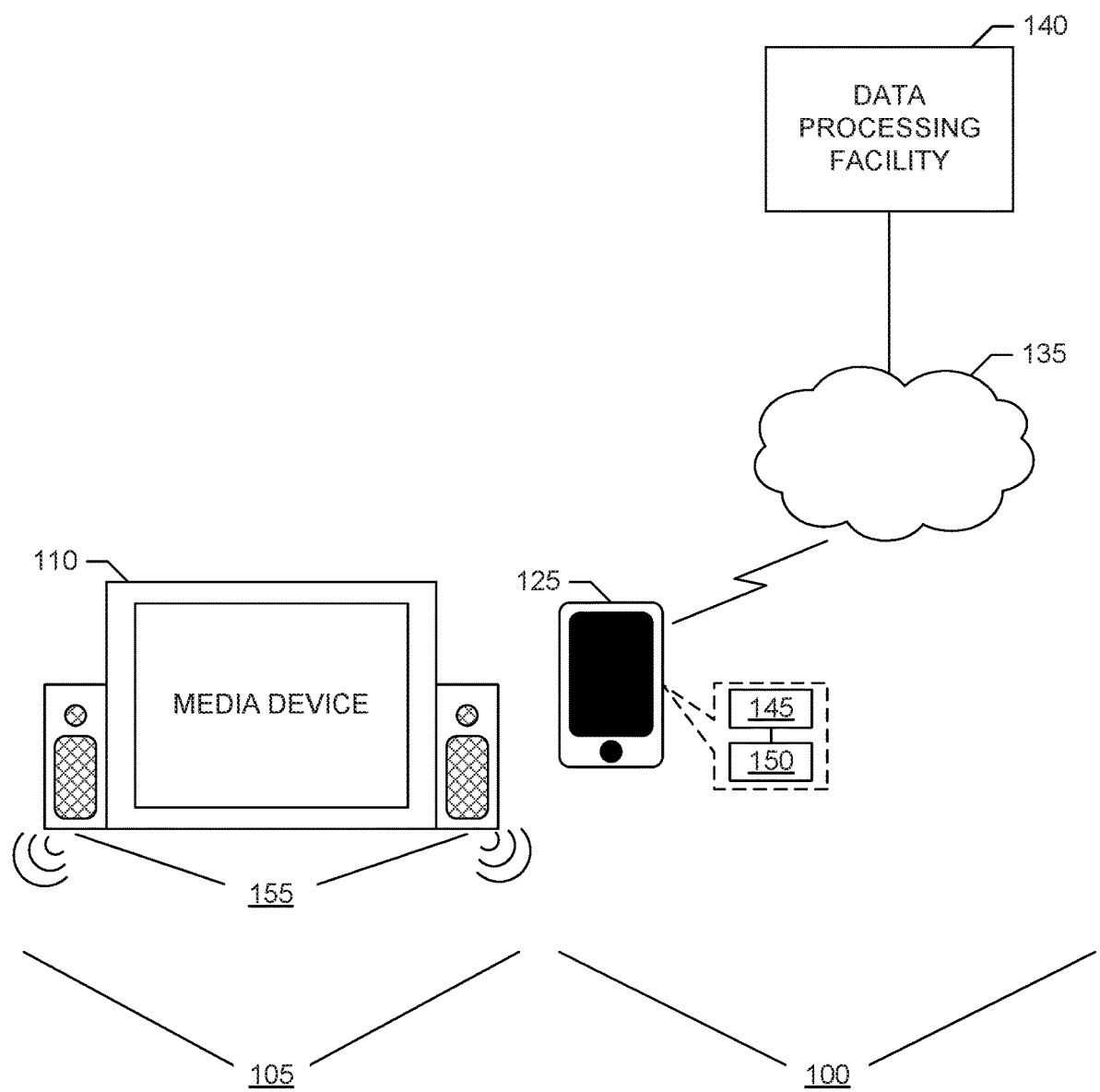
FIG. 1 is a block diagram of an example media monitoring system including an example portable device implementing an example media device monitor supporting power efficient detection of watermarks in media signals in accordance with the teachings of this disclosure.

Wherever possible, the same reference numbers will be used throughout the drawing(s) and accompanying written description to refer to the same or like parts, elements, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

DETAILED DESCRIPTION

Methods, apparatus, systems and articles of manufacture (e.g., physical storage media) to implement power efficient detection of watermarks in media signals are disclosed herein. Example watermark detection methods disclosed herein include operating a watermark detector in a first operating mode (e.g., such as a search mode) to search for a first watermark in a media signal. Such disclosed example methods also include, in response to detecting the first watermark, determining whether the first watermark satisfies a first condition. Such disclosed example methods further include, in response to determining the first watermark satisfies the first condition, operating the watermark detector in a second operating mode (e.g., such as a confirmation mode) in which the watermark detector cycles between a sleep interval and an active interval to detect a second watermark at a second location in the media signal relative to a first location of the first watermark in the media signal.

In some disclosed example methods, the first watermark includes a first group of symbols and a second group of symbols. In some such examples, the first group of symbols is repeated in the first watermark and the second watermark, whereas the second group of symbols differs between the first watermark and the second watermark. In some such disclosed example methods, detecting the first watermark includes detecting the first group of symbols in the media signal. Also, in some such disclosed example methods, the first watermark satisfies the first condition when the first group of symbols of the first watermark match a corresponding first group of symbols repeated in a third watermark detected by the watermark detector in the media signal within a first time period prior to detection of the first watermark. Additionally or alternatively, in some such disclosed example methods, the first watermark satisfies the first condition when respective ones of the first group of symbols of the first watermark satisfy respective symbol strength conditions.

Additionally or alternatively, in some such disclosed example methods, operating the watermark detector in the second operating mode includes operating the watermark detector to detect, in the media signal, the first group of symbols repeated in the second watermark. Additionally or alternatively, some such disclosed example methods further include continuing to operate the watermark detector in the second operating mode if at least one of (i) the first group of symbols repeated in the second watermark satisfies a first symbol strength condition or (ii) the first group of symbols repeated in the second watermark match at least a first number of the corresponding first group of symbols of the first watermark. Some such disclosed example methods also include transitioning operation of the watermark detector out of the second operating mode if (iii) the first group of symbols repeated in the second watermark does not satisfy the first symbol strength condition and (iv) the first group of symbols repeated in the second watermark does not match at least the first number of the corresponding first group of symbols of the first watermark.

In some such disclosed example methods, the sleep interval is a first sleep interval, and transitioning operation of the watermark detector out of the second operating mode transitioning operation of the watermark detector to the first operating mode if a second condition is met. Some such disclosed example methods also include, if the second condition is not met, transitioning operation of the operation of the watermark detector to a third operating mode (e.g., a sleep mode) in which the watermark detector is to (i) sleep for at least one of the first sleep interval or a second sleep interval different from the first sleep interval, and then (ii) transition operation to the first operating mode.

Additionally or alternatively, some example methods disclosed herein further include searching a buffer of prior watermark symbols evaluated by the watermark detector to detect a third watermark in the media signal in response to at least one of: (i) detecting the first watermark or (ii) detecting the second watermark at a third location in the media signal different from the second location.

Additionally or alternatively, some example methods disclosed herein further include, in response to not detecting the first watermark for a first time period of operating the watermark detector in the first operating mode, determining whether a second condition is met and, if the second condition is met, continuing to operate the watermark detector in the first operating mode. Some such disclosed example methods also include, if the second condition is not met, transitioning operation of the watermark detector to a third operating mode (e.g., a sleep mode) in which the watermark detector is to (i) sleep for at least one of the first sleep interval or a second sleep interval different from the first sleep interval then (ii) transition operation to the first operating mode.

These and other example methods, apparatus, systems and articles of manufacture (e.g., physical storage media) to implement power efficient detection of watermarks in media signals are disclosed in greater detail below.

As noted above, prior media monitoring systems employing watermarks typically include watermark decoders that run in a continuous fashion to ensure detection of the watermarks embedded in the media signals output from monitored media devices. However, when such watermark decoders are implemented by/in portable meters, their continuous operation can quickly consume the available power of the portable meter and, thus, reduce the amount of time the portable meter is able to perform media monitoring. Example methods, apparatus, systems and articles of manufacture (e.g., physical storage media) disclosed herein to implement power efficient detection of watermarks in media signals solve the technical problem of excessive power consumption associated with conventional watermark decoders in meters (e.g., portable meters). Power efficient detection of watermarks in media signals, as disclosed herein, is especially useful in watermarking systems in which a least of portion of a watermark is embedded repeatedly in the watermarked media at a given watermark repetition rate. For example, the watermark may include a first portion corresponding to media identification symbols and a second portion corresponding to timestamp symbols. In such examples, the media identification symbols remain the same across watermarks embedded in the media, whereas the timestamp symbols change with each successive watermark to, for example, identify a particular elapsed time within the watermarked media. In such examples, the media symbol portion of the watermark is repeated in the watermarked audio at the given watermark repetition rate.

Power efficient detection of watermarks in media signals, as disclosed herein, takes advantage of such repeating watermarks. For example, and as disclosed in further detail below, a watermark detector operated in accordance with the teachings of the disclosure is operated in a first (e.g., search) mode to search for and detect a first watermark. Then, after a first watermark is detected, the watermark detector is operated in a second (e.g., confirmation) mode in which watermark detection is targeted at the locations in the media signal where other watermarks are expected based on the watermark repetition rate and the duration of the watermark. At other times, the watermark detector is placed in a low-power sleep mode to conserve power. In this way, portable meters utilizing power efficient detection of watermarks in media signals, as disclosed herein, can achieve increased operating times and/or more efficient operation relative to prior portable meters. For example, when a watermark detector is placed in a low-power sleep mode in accordance with the teachings disclosed herein, a device (e.g., a portable device) implementing the watermark detector may also be placed in a low power mode. Additionally or alternatively, when a watermark detector is placed in a low-power sleep mode in accordance with the teachings disclosed herein, the device (e.g., portable device) implementing the watermark detector may redirect the processing power (e.g., processor cycles) used for watermark detection to native and/or other functions implemented by the device. Further techniques for improving efficiency of such portable meters are also disclosed in detail below.

Turning to the figures, a block diagram of an example media monitoring system 100 implementing power efficient detection of watermarks in media signals as disclosed herein is illustrated in FIG. 1. The example media monitoring system 100 supports monitoring of media presented at one or more monitored sites, such as an example monitored site 105 illustrated in FIG. 1. The monitored site 105 includes an example media device 110, which is also referred to herein as a media presentation device 110. Although the example of FIG. 1 illustrates one monitored site 105 and one media device 110, power efficient detection of watermarks in media signals as disclosed herein can be implemented in media monitoring systems 100 supporting any number of monitored sites 105 having any number of media devices 110.

The media monitoring system 100 of the illustrated example includes an example media device meter 125, also referred to as a meter 125, a site meter 125, a site unit 125, a home unit 125, a portable device 125, etc., to monitor media presented by the media device 110. In the illustrated example, the media monitored by the media device meter 125 can correspond to any type of media presentable by the media device 110. For example, monitored media can correspond to media content, such a television programs, radio programs, movies, Internet video, video-on-demand, etc., as well as commercials, advertisements, etc. In the illustrated example, the media device meter 125 determines metering data that may identify and/or be used to identify media presented by the media device (and, thus, infer media exposure) at the monitored site 105. The media device meter 125 then stores and reports this metering data via an example network 135 to an example data processing facility 140. The data processing facility 140 performs any appropriate post-processing of the metering data to, for example, determine audience ratings information, identify targeted advertising to be provided to the monitored site 105, etc. In the illustrated example, the network 135 can correspond to any type(s) and/or number of wired and/or wireless data networks, or any combination thereof.

In the illustrated example, the media device 110 monitored by the media device meter 125 can correspond to any type of audio, video and/or multimedia presentation device capable of presenting media audibly and/or visually. For example, the media device 110 can correspond to a television and/or display device that supports the National Television Standards Committee (NTSC) standard, the Phase Alternating Line (PAL) standard, the Systeme Electronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As other examples, the media device 110 can correspond to a multimedia computer system, a personal digital assistant, a cellular/mobile smartphone, a radio, a tablet computer, etc.

In the media monitoring system 100 of the illustrated example, the media device meter 125 and the data processing facility 140 cooperate to perform media monitoring based on detecting media watermarks. Moreover, the media device meter 125 detects media watermarks in a power efficient manner as disclosed herein. Examples of watermarks include identification codes, ancillary codes, etc., that may be transmitted within media signals. For example, identification codes can be transmitted as watermarked data embedded or otherwise included with media (e.g., inserted into the audio, video, or metadata stream of media) to uniquely identify broadcasters and/or media (e.g., content or advertisements). Watermarks can additionally or alternatively be used to carry other types of data, such as copyright protection information, secondary data (e.g., such as one or more hyperlinks pointing to secondary media retrievable via the Internet and associated with the primary media carrying the watermark), commands to control one or more devices, etc. Watermarks are typically extracted using a decoding operation.

In contrast, signatures are a representation of some characteristic of the media signal (e.g., a characteristic of the frequency spectrum of the signal). Signatures can be thought of as fingerprints. They are typically not dependent upon insertion of data in the media, but instead preferably reflect an inherent characteristic of the media and/or the signal transporting the media. Systems to utilize codes and/or signatures for audience measurement are long known. See, for example, U.S. Pat. No. 5,481,294 to Thomas et al., which is hereby incorporated by reference in its entirety.

Figure 3:
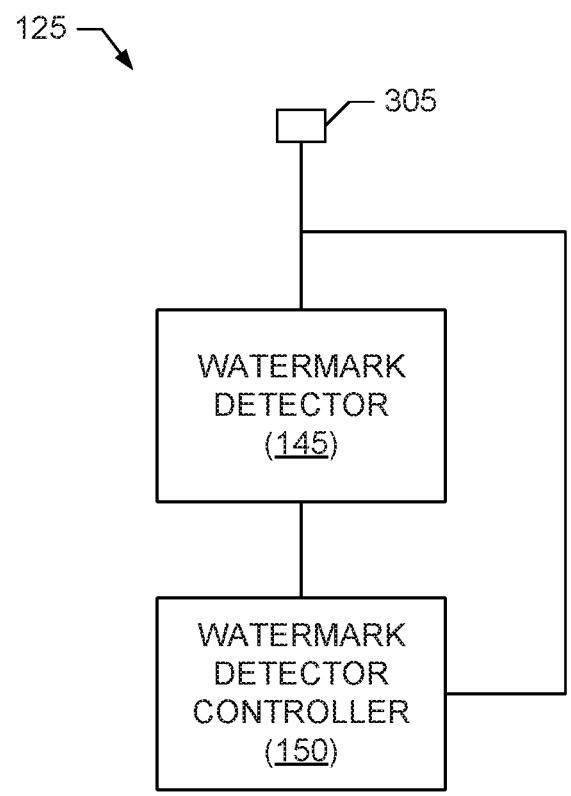
FIG. 3 is a block diagram of an example implementation of the media device monitor of FIG. 1, which includes an example watermark detector controller to implement power efficient detection of watermarks in media signals in accordance with the teachings of this disclosure.

In the illustrated example of FIG. 1, the media device meter 125 is implemented by a portable device including an example watermark detector 145 and an example watermark detector controller 150. In the illustrated example, the watermark detector 145 is configured to detect watermark(s) in media signal(s) output from a monitored media device, such as the example media device 110. In the illustrated example, the watermark detector controller 150 is configured to control operation of the watermark detector 145 in a power efficient manner in accordance with the teachings of this disclosure. In some examples, the media device meter 125 corresponds to a special purpose portable device constructed to implement the example watermark detector 145 and the example watermark detector controller 150. In other examples, the media device meter 125 corresponds to any portable device capable of being adapted (via hardware changes, software changes, firmware changes, etc., or any combination thereof) to implement the example watermark detector 145 and the example watermark detector controller 150. As such, the media device meter 125 can be implemented by a smartphone, a tablet computer, a handheld device, a wrist-watch type device, other wearable devices, a special purpose device, etc. In some examples, the media device meter 125 can be implemented by a portable device that, although portable, is intended to be relatively stationary. Furthermore, in some examples, the media device meter 125 can be implemented by or otherwise included in the media device 110, such as when the media device 110 corresponds to a portable device (e.g., a smartphone, a tablet computer, a handheld device, etc.) capable of presenting media. (This latter implementation can be especially useful in example scenarios in which a media monitoring application is executed on the media device 110 itself, but the media device 110 prevents, e.g., via digital rights management or other techniques, third-party applications, such as the media monitoring application, from accessing protected media data stored on the media device 110.) An example implementation of the media device meter 125 is illustrated in FIG. 3, which is described in further detail below.

Figure 2:
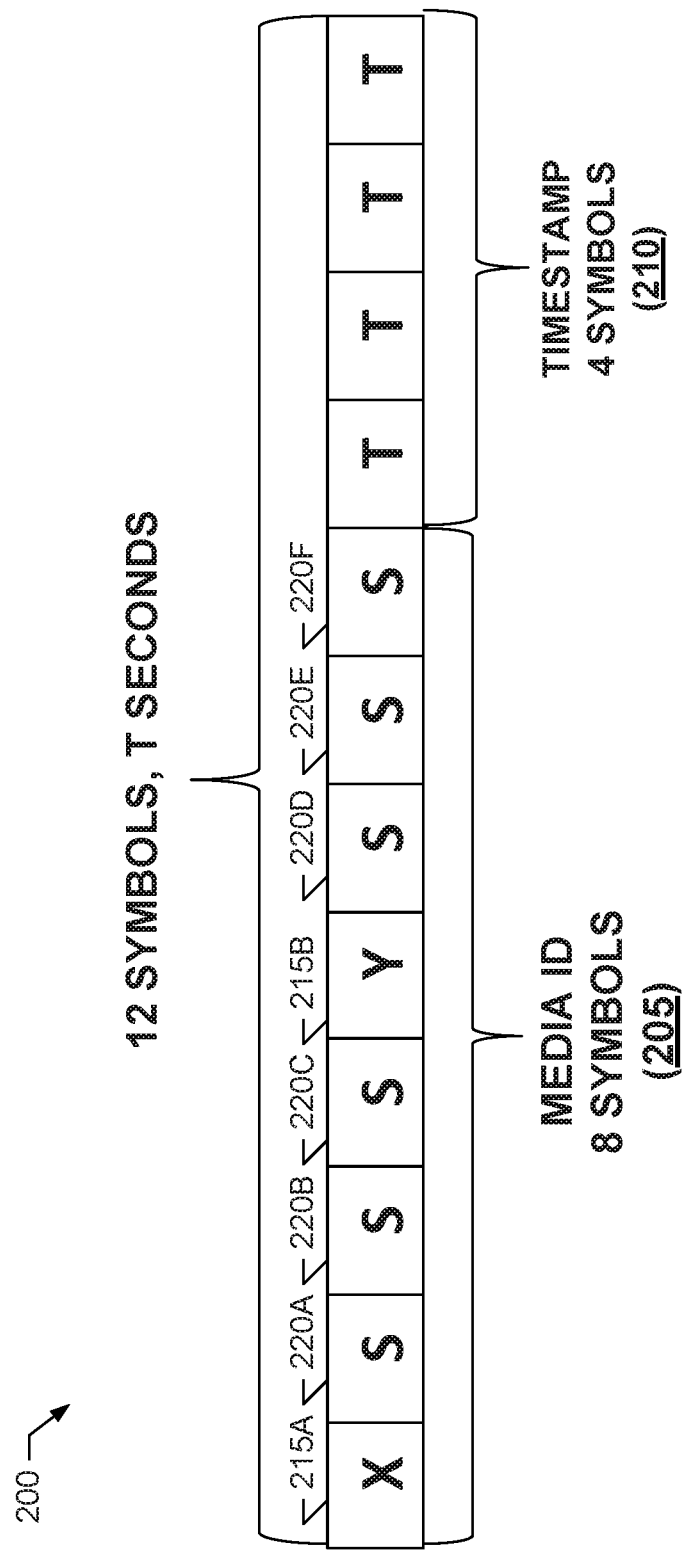
FIG. 2 illustrates an example watermark to be detected by the example media device monitor of FIG. 1.

FIG. 2 illustrates an example watermark 200 that the example media device meter 125 may be configured to detect. The watermark 200 of the illustrated is embedded or otherwise included in media to be presented by media device(s), such as the example media device 110. For example, the watermark 200 may be embedded in an audio portion (e.g., an audio data portion, an audio signal portion, etc.) of the media, a video portion (e.g., a video data portion, a video signal portion, etc.) of the media, or a combination thereof. The example watermark 200 of FIG. 2 includes an example first group of symbols 205 and an example second group of symbols 210. In the illustrated example of FIG. 2, the first group of symbols 205 is repeated in successive watermarks 200 embedded/included in the media, whereas the second group of symbols 210 differs between successive watermarks 200 embedded/included in the media.

In the example watermark of FIG. 2, the first group of symbols 205 conveys media identification data (e.g., a media identifier) identifying the media watermarked by the watermark 200. For example, the media identification data conveyed by the first group of symbols 205 may include data identifying a broadcast station providing the media, a name (e.g., program name) of the media, a source (e.g., a website) of the media, etc. Thus, in the illustrated example of FIG. 2, the first group of symbols 205 is also referred to as a first group of media identification symbols 205 (or simply the media identification symbols 205). Furthermore, the media identification data conveyed by the first group of symbols 205 (e.g., the media identification symbols 205) is repeated in successive watermarks 200 embedded/included in the media.

In some examples, the first group of symbols 205 of the watermark 200 includes example marker symbols 215A-B to assist the watermark detector 145 in detecting the start of the watermark 200 in the watermarked media, and example data symbols 220A-F to convey the media identification data. Also, in some examples, corresponding symbols pairs in similar respective locations after the first marker symbol 215A and the second marker symbol 215B are related by an offset. For example, the value of data symbol 220D may correspond to the value of data symbol 220A incremented by an offset, the value of data symbol 220E may correspond to the value of data symbol 220B incremented by the same offset, and the value of data symbol 220F may correspond to the value of data symbol 220C incremented by the same offset, as well. In such examples, the symbols pairs 220A/D, 220B/E and 220C/F are referred to as symbol offset pairs, or offset pairs, and the offset used to generate the symbol offset pairs forms an additional data symbol that can be used to convey the media identification data.

In the example watermark 200 of FIG. 2, the second group of symbols 210 conveys timestamp data (e.g., a timestamp) identifying, for example, a particular elapsed time within the watermarked media. Thus, in the illustrated example of FIG. 2, the second group of symbols 210 is also referred to as the second group of timestamp symbols 210 (or simply the timestamp symbols 210). Furthermore, the timestamp data conveyed by the second group of symbols 210 (e.g., the timestamp symbols 210) differs in successive watermarks 200 embedded/included in the media (e.g., as the elapsed time of the watermarked media increases with each successive watermark 200).

In the illustrated example of FIG. 2, the watermark 200 is embedded/included in the desired media at a repetition interval of T seconds (or, in other words, at a repetition rate of 1/T seconds), with the first group of symbols 205 remaining the same in successive watermarks 200, and the second group of symbols 205 varying in successive watermarks 200. For example, the repetition interval T may correspond to T=4.8 seconds. As there are 12 symbols in the example watermark 200 (e.g., 8 symbols in the first group of symbols 205 and 4 symbols in the second group of symbols 210) each watermark symbol in the illustrated example has a duration of 4.8/12=0.4 seconds. However, other values for the repetition interval T may be used in other examples.

In some examples, a watermark symbol included in the watermark 200 is able to take on one of several possible symbol values. For example, if a symbol in the watermark 200 represents 4 bits of data, then the symbol is able to take on one of 16 different possible values. For example, each possible symbol value may correspond to a different signal amplitude, a different set of code frequencies, etc. In some such examples, to detect a watermark symbol embedded/included in watermarked media, the example watermark detector 145 processes monitored media data/signals output from the example media device 110 to determine measured values (e.g., signal-to-noise ratio (SNR) values) corresponding to each possible symbol value the symbol may have. The watermark detector 145 then selects the symbol value corresponding to the best (e.g., strongest, largest, etc.) measured value (possibly after averaging across multiple samples of the media data/signal) as the detected symbol value for that particular watermark symbol.

An example implementation of the media device meter 125 (e.g., which may be a portable device) of FIG. 1 is illustrated in FIG. 3. In the illustrated example of FIG. 3, the media device meter 125 includes one or more example sensor(s) 305 to detect media data/signal(s) emitted or otherwise output by the example media device 110. In some examples, the sensor(s) 305 include an audio sensor to monitor audio data/signal(s) output by the media device 110. Such an audio sensor may be implemented using any type of audio sensor or audio interface, such as a microphone, a transducer, a cable/wire, etc., capable of receiving and processing audio signals (e.g., such as in the form of acoustic and/or electrical signals). Additionally or alternatively, in some examples, the sensor(s) 305 include a video sensor to monitor video data/signal(s) output by the media device 110. Such a video sensor may be implemented using any type of video sensor or video interface, such as a camera, a light detector, a cable/wire, etc., capable of receiving and processing video signals (e.g., such as in the form of optical images and/or electrical signals).

The example media device meter 125 of FIG. 3 also includes the example watermark detector 145. In the illustrated example of FIG. 3, the watermark detector 145 is configured to detect watermarks, such as the example watermark 200 of FIG. 2, in the media data/signal(s) detected by the example sensor(s) 305. In some examples, the watermark detector 145 of FIG. 3 is structured to process audio data/signal(s) obtained by the sensor(s) 305 to detect symbols of instances of the watermark 200 that are encoded in one or more frequencies of the sensed audio data/signal(s), or otherwise encoded in the frequency domain of the sensed audio data/signal(s). Examples of encoding watermarks in the frequency domain of an audio signal, and corresponding example watermark detection techniques that may be implemented by the example watermark detector 145, are described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, U.S. Publication No. 2010/0223062, entitled "Methods and Apparatus to Perform Audio Watermarking and Watermark Detection and Extraction," which was published on Sep. 2, 2010, U.S. Pat. No. 6,871,180, entitled "Decoding of Information in Audio Signals," which issued on Mar. 22, 2005, U.S. Pat. No. 5,764,763, entitled "Apparatus and Methods for Including Codes in Audio Signals and Decoding," which issued on Jun. 9, 1998, U.S. Pat. No. 5,574,962, entitled "Method and Apparatus for Automatically Identifying a Program Including a Sound Signal," which issued on Nov. 12, 1996, U.S. Pat. No. 5,581,800, entitled "Method and Apparatus for Automatically Identifying a Program Including a Sound Signal," which issued on Dec. 3, 1996, U.S. Pat. No. 5,787,334, entitled "Method and Apparatus for Automatically Identifying a Program Including a Sound Signal," which issued on Jul. 28, 1998, and U.S. Pat. No. 5,450,490, entitled "Apparatus and Methods for Including Codes in Audio Signals and Decoding," which issued on Sep. 12, 1995, all of which are hereby incorporated by reference in their entireties. U.S. Pat. Nos. 8,359,205, 8,369,972, U.S. Publication No. 2010/0223062, U.S. Pat. Nos. 6,871,180, 5,764,763, 5,574,962, 5,581,800, 5,787,334 and 5,450,490 describe example watermarking systems in which a watermark is included in an audio signal by manipulating a set of frequencies of the audio signal.

In some examples, the watermark detector 145 of FIG. 3 is structured to process audio data/signal(s) obtained by the sensor(s) 305 to detect symbols of instances of the watermark 200 that are encoded in one or more time domain characteristics of the sensed audio signal, such as by modulating the amplitude and/or phase of the audio signal in the time domain. Examples of encoding watermarks in the time domain of an audio signal, and corresponding example watermark detection techniques that may be implemented by the example watermark detector 145, include, but are not limited to, examples in which spread spectrum techniques are used to include a watermark in an audio signal. For example, such a watermark can be encoded in the audio signal by (1) spreading the watermark by modulating the watermark with a pseudo-noise sequence and then (2) combining the spread watermark with the audio signal. Detection of such a watermark involves correlating the audio signal (after being watermarked) with the pseudo-noise sequence, which de-spreads the watermark, thereby permitting the watermark to be detected after the correlation.

The example media device meter 125 of FIG. 3 also includes the example watermark detector controller 150. In the illustrated example of FIG. 3, the watermark detector controller 150 is configured to take advantage of watermarks, such as the example watermark 200, that are embedded repeatedly in media by initially configuring the example watermark detector 145 to search for and detect a first watermark, and then configuring the watermark detector 145 to target watermark detection at the locations in the media (e.g., in the media audio signal) where other watermarks are expected based on the watermark repetition rate and the duration of the watermark. At other times, the watermark detector controller 150 of the illustrated example places the watermark detector 145 in a low-power sleep mode to conserve power (e.g., by disabling power to the watermark detector 145, by asserting a control input/signal to place the watermark detector 145 in a low-power mode, by causing the watermark detector 145 to not be invoked by a processor, etc.).

In some examples, the watermark detector controller 150 causes the watermark decoder to operate in one of at least three modes, such as a search mode, a confirmation mode and a sleep mode. In the search mode, the watermark detector controller 150 activates the watermark detector 145 to begin detecting a watermark in a monitored media (e.g., audio) signal. This mode of operation is referred to herein as the search mode and, in some examples, the watermark detector controller 150 causes the watermark detector 145 to continue operating in the search mode until (1) a watermark is detected and/or one or more trigger conditions, which indicate conditions are determined to be conducive for watermark detection, is/are met, or (2) a search interval has expired. If the search interval expires before a watermark is detected or the trigger condition is met, the watermark detector controller 150 causes the watermark detector 145 to transition to a sleep mode to conserve power for a sleep interval, after which watermark detector controller 150 causes the watermark detector 145 to again reenter search mode.

In some examples, if a watermark is detected during search mode, the watermark detector controller 150 verifies detection of the watermark (e.g., to reduce the likelihood that a false watermark detection will cause the watermark detector controller 150 to transition the watermark detector 145 out of the search mode prematurely). In examples in which the watermark being detected by the watermark detector 145 corresponds to the example watermark 200, the watermark detector controller 150 may verify that a valid watermark was detected if the first group of media identification symbols 205 of the detected watermark 200 match the corresponding first group of media identification symbols 205 of a prior detected watermark 200 (e.g., as this portion is embedded repeatedly in the media signal). If the watermark detector controller 150 is unable to validate the detected watermark, and the search interval expires with no other watermarks being detected and validated, and with the trigger condition no longer being met, the watermark detector controller 150 causes the watermark detector 145 to transition to the sleep mode to conserve power for the sleep interval, after which the watermark detector controller 150 wakes the watermark detector 145 and causes it to reenter search mode. However, if the watermark detector controller 150 is unable to validate the detected watermark, but the search interval has not expired or the trigger condition is still being met, the watermark detector controller 150 causes the watermark detector 145 to remain enabled and continue to operate to perform watermark detection.

In some examples, if a watermark is detected during search mode, and the watermark detector controller 150 verifies that the detected watermark is valid, the watermark detector controller 150 causes the watermark detector to transition to a confirmation mode. In the confirmation mode, the watermark detector controller 150 reduces the operation interval of the watermark detector 145 to cause a corresponding reduction in power consumption. For example, in the confirmation mode, the watermark detector controller 150 places the watermark detector 145 in the sleep mode for a sleep interval (which may be the same or different from the sleep interval used for a transition from search mode into sleep mode). The watermark detector controller 150 then wakes the watermark detector 145 to perform watermark detection and to store detected watermark symbols in a watermark symbol buffer. The watermark detector controller 150 examines the watermark symbol buffer at a location where an embedded watermark is expected to be present in the media signal (e.g., due to the watermark repetition rate). If watermark confirmation is successful (e.g., if a valid watermark is detected), the watermark detector controller 150 places the watermark detector 145 in the sleep mode to conserve power for the sleep interval, after which watermark detector controller 150 causes the watermark detector 145 to reenter confirm mode. However, if a valid watermark is not detected, the watermark detector controller 150 searches the watermark symbol buffer to determine if a watermark is present in the media signal, but at a different location than expected (e.g., which may be due to a change in the media being presented). If a new watermark is detected, the watermark detector controller 150 places the watermark detector 145 back in the sleep mode to conserve power for the sleep interval, after which the watermark detector controller 150 causes the watermark detector 145 to reenter confirm mode. However, if no watermark is detected after expiration of a time interval (which may be the same or different from the search interval), the watermark detector controller 150 places the watermark detector 145 into the search mode and the process repeats.

Figure 4:
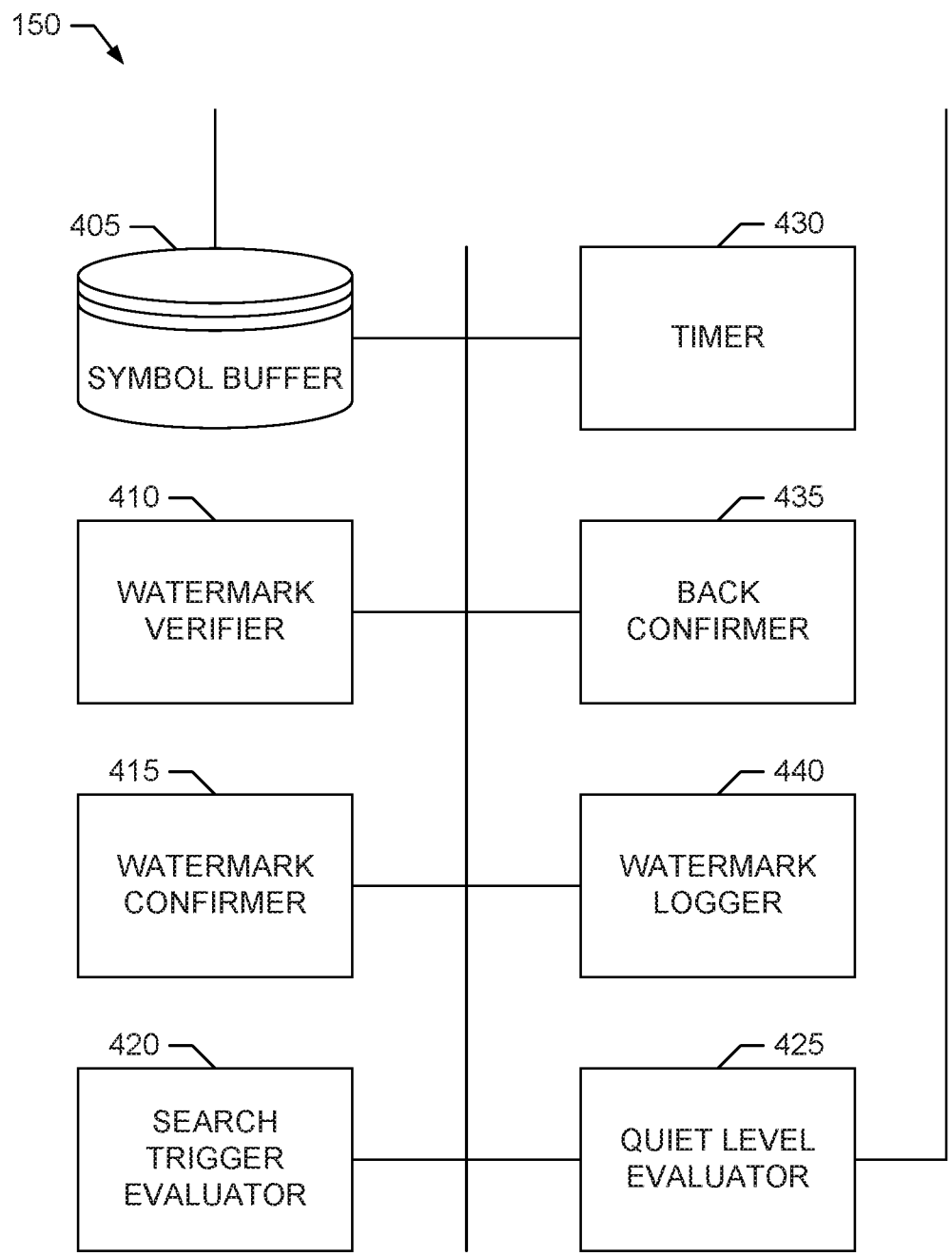
FIG. 4 is a block diagram illustrating an example implementation of the watermark detector controller of FIG. 1, which includes an example watermark verifier, an example watermark confirmer and an example search trigger evaluator.

A block diagram of an example implementation of the watermark detector controller 150 of FIGS. 1 and/or 3 is illustrated in FIG. 4. The example watermark detector controller 150 of FIG. 4 includes an example symbol buffer 405 to store measured watermark symbol values determined by the example watermark detector 145 when the watermark detector 145 is active. In some examples, to detect a watermark symbol, the watermark detector 145 determines measured watermark symbol values corresponding to each possible symbol value the watermark symbol may have. For example, to detect the symbol 220A in the example watermark 200, the watermark detector 145 determines, for each symbol interval (e.g., 0.4 seconds in the example of FIG. 2) corresponding to the symbol 220A, measured watermark signal-to-noise (SNR) values corresponding to each of the 16 possible symbol values the symbol 220A may have. The symbol buffer 405 stores the measured watermark symbol values provided by the watermark detector 145 for further processing. The example symbol buffer 405 may be implemented by any appropriate memory, storage device, etc., such as one or more of the volatile memory 1414 and/or the mass storage device 1428 of the example processor platform 1400 of FIG. 14, which is described in further detail below.

The example watermark detector controller 150 of FIG. 4 also includes an example watermark verifier 410 to operate the example watermark detector 145 in a first (e.g., search) mode and to verify watermarks detected by the watermark detector 145, as described above. In some examples, the watermark verifier 410 operates the watermark detector 145 in a first (e.g., search) operating mode to search for a first watermark in a media signal output from the example media device 110. Then, in response to the watermark detector 145 detecting the first watermark, the watermark verifier 410 determines whether the detected watermark satisfies one or more verification conditions. If the verification condition(s) is(are) satisfied, the watermark verifier 410 indicates that the detected watermark is verified.

In examples in which the watermark detector 145 is configured to detect the example watermark 200 of FIG. 2, the watermarks to be detected by the watermark detector 145 in the first (e.g., search) mode include the first group of media identification symbols 205, which are repeated in successive watermarks, and the second group of timestamp symbols 210, which vary among successive watermarks. In some such examples, the watermark verifier 410 operates the watermark detector 145 in the first (e.g., search) operating mode to detect the first group of media identification symbols 205. Furthermore, if the watermark verifier 410 determines that the watermark detector 145 has detected a first watermark, which includes the first group of media identification symbols 205, in the monitored media signal (e.g., by detecting the first group of media identification symbols 205 in the symbol buffer 405), the watermark verifier 410 then determines whether the first group of media identification symbols 205 satisfy a verification condition to verify the detected watermark. For example, the watermark verifier 410 may determine that the verification condition is satisfied when the first group of media identification symbols 205 detected by the watermark detector 145 during the first (e.g., search) operating mode match a corresponding first group of media identification symbols 205 repeated in a prior watermark detected by the watermark detector 145 during a time period prior to detection of the current watermark. Additionally or alternatively, in some examples, the watermark verifier 410 may determine that the verification condition is satisfied when the symbols in the first group of media identification symbols 205 satisfy one or more symbol strength conditions individually or collectively.

The watermark detector controller 150 of FIG. 4 also includes an example watermark confirmer 415 to operate the example watermark detector 145 in a second (e.g., confirmation) mode in response to the watermark verifier 410 verifying a first watermark detected by the watermark detector 145 during the first (e.g., search) mode. In the second (e.g., confirmation) mode, the watermark confirmer 415 causes the watermark detector 145 to cycle between a sleep interval and an active interval to detect subsequent watermarks at expected locations in the monitored media signal relative to the location of the first watermark detected and verified during the first (e.g., search) operating mode. For example, if the watermarks to be detected by the watermark detector 145 correspond to the example watermark 200 of FIG. 2, the watermark confirmer 415 may operate the watermark detector 145 to detect, in the monitored media signal, the first group of media identification symbols 205 repeated in a second watermark at a second location in the monitored media signal that is determined relative to the location of the first watermark based on the repetition interval and duration of the watermarks 200 embedded in the monitored media signal.

Furthermore, in some examples, the watermark confirmer 415 continues to operate the watermark detector 145 in the second (e.g., confirmation) operating mode if the first group of media identification symbols 205 repeated in a second watermark detected during the second (e.g., confirmation) mode satisfy one or more symbol strength conditions. Additionally or alternatively, in some examples, the watermark confirmer 415 continues to operate the watermark detector 145 in the second (e.g., confirmation) operating mode if the first group of media identification symbols 205 repeated in the second watermark detected during the second (e.g., confirmation) mode match at least a threshold number of the first group of media identification symbols 205 included in a prior watermark detected by the watermark detector 145. The prior watermark may correspond to, for example, the first watermark detected by the watermark detector 145 during the first (e.g., search) operating mode, or another watermark previously detected by the watermark detector 145 during the second (e.g., confirmation) mode. However, in some such examples, the watermark confirmer 415 transitions operation of the watermark detector 145 out of the second (e.g., confirmation) operating mode if, for example, the first group of media identification symbols 205 repeated in the second watermark does not satisfy the symbol strength condition(s) and/or the first group of media identification symbols 205 repeated in the second watermark does not match at least the threshold number of the corresponding first group of media identification symbols 205 included in a prior detected watermark.

In some examples, the watermark detector controller 150 of FIG. 4 includes an example search trigger evaluator 420 to evaluate one or more trigger conditions to determine whether to continue operating the watermark detector 145 in the first (e.g., search), or cause the watermark detector 145 to be placed in a third (e.g., sleep) operating mode. For example, in response to a watermark not being detected for a first time period of operating the watermark detector 145 in the first (e.g., search) operating mode, the search trigger evaluator 420 may evaluate whether one or more trigger conditions have been met. If, for example, a trigger condition is met, the search trigger evaluator 420 may continue to operate the watermark detector 145 in the first (e.g., search) operating mode. However, if the trigger condition is not met, the search trigger evaluator 420 may transition operation of the watermark detector 145 to a third (e.g., sleep) operating mode in which the watermark detector 145 sleeps for a sleep interval, and then is woken and transitioned back to operating in the first (e.g., search) operating mode. The sleep interval used during the third (e.g., sleep) operating mode may be the same as, or different from, the sleep interval used during the second (e.g., confirmation) mode.

Additionally or alternatively, when the watermark confirmer 415 decides to transition operation of the watermark detector 145 out of the second (e.g., confirmation) operating mode, in some examples the search trigger evaluator 420 determines how the watermark detector 145 is to be transitioned out of the second (e.g., confirmation) operating mode. For example, the search trigger evaluator 420 may cause operation of the watermark detector 145 to transition from the second (e.g., confirmation) operating mode to the first (e.g., search) operating mode discussed above if a trigger condition is met. However, if the trigger condition is not met, the search trigger evaluator 420 may transition operation of the watermark detector 145 to the third (e.g., sleep) operating mode in which the watermark detector 145 sleeps for a sleep interval, and then is woken and transitioned back to operating in the first (e.g., search) operating mode. As noted above, the sleep interval used during the third (e.g., sleep) operating mode may be the same as, or different from, the sleep interval used during the second (e.g., confirmation) mode.

In some examples, the trigger condition(s) evaluated by the search trigger evaluator 420 include watermark symbol strength conditions, which are described in further detail below. Additionally or alternatively, in some examples, the trigger condition(s) evaluated by the search trigger evaluator 420 include a quiet level condition evaluated by an example quiet level evaluator 425 included in the example watermark detector controller 150 of FIG. 4. The quiet level evaluator 425 of the illustrated example processes audio samples received from, for example, the example sensor(s) 305 of the example media device meter 125 to determine whether the strength (e.g., amplitude, power, energy, etc.) of the audio samples obtained from the sensor(s) 305 indicates that the measured audio is quiet. For example, the quiet level evaluator 425 may compare the strength of the sensed audio samples to a quiet threshold which, if not met, indicated the measured audio is quiet. In such examples, if the measured audio is determined to be quiet, the trigger condition is not satisfied and the watermark detector 145 is placed in the third (e.g., sleep) mode. However, if the measured audio is determined to not be quiet, the trigger condition is satisfied and the watermark detector 145 is placed in the first (e.g., search) mode.

The example watermark detector controller 150 of FIG. 4 also includes an example timer 430 to, for example, track the sleep interval(s) employed in the second (e.g., confirmation) and the third (e.g., sleep) modes. For example, the timer 430 may be configured to track a first sleep interval when the watermark detector controller 150 is causing the watermark detector 145 to operate in the second (e.g., confirmation) operating mode Additionally or alternatively, the timer 430 may be configured to track a second sleep interval (e.g., which may be the same as, or different from, the first sleep interval) when the watermark detector controller 150 is causing the watermark detector 145 to operate in the third (e.g., sleep) operating mode. The time 430 may be implemented by any type(s) and/or number(s) of timing sources, clocks, oscillators, etc.

In some examples, the watermark detector controller 150 of FIG. 4 includes an example back confirmer 435 to process the measured watermark symbol values stored in the example symbol buffer 405 to search for watermark(s) in addition to those watermarks detected directly in the first (e.g., search) and/or the second (e.g., confirmation) operating modes. For example, when transitioning operation of the watermark detector 145 from the first (e.g., search) operating mode to the second (e.g., confirmation) operating mode, the watermark verifier 410 may invoke the back confirmer 435 to search measured watermark symbol values stored in the symbol buffer 405 and corresponding to a given time period (e.g., 15 minutes or some other value) prior to detection of the first watermark during the first (e.g., search) operating mode. If the back confirmer 435 detects any other watermarks, the back confirmer 435 invokes the watermark verifier 410 to verify the detected watermark. In such examples, the watermark confirmer 415 uses the location(s) of any other detected and verified watermarks to determine other period(s) during which the watermark detector 145 is to be activated during the second (e.g., confirmation) mode to detect subsequent instances of these watermarks in the monitored media signal.

In some examples, the back confirmer 435 is additionally or alternatively invoked by the watermark confirmer 415 during the second (e.g., confirmation) mode to search measured watermark symbol values stored in the symbol buffer 405 and corresponding to a given time period (e.g., 1 minute or some other value) prior to detection of the watermark at the expected location in the media signal corresponding to when the watermark detector 145 is configured to be active. For example, during the second (e.g., confirmation) mode, the watermark confirmer 415 may wake the watermark detector 145 prior to the expected location of the next watermark to be detected in the monitored media signal. In such examples, the back confirmer 435 may be invoked to search the measured watermark symbol values stored in the symbol buffer 405 for watermark(s) occurring prior to the expected location of the next watermark. In this way, the back confirmer 435 permits the example watermark detector controller 150 to quickly adjust to watermarks being embedded at different locations in the media signal, and/or to new media being presented by the monitored media device 110.

The example watermark detector controller 150 of FIG. 4 also includes an example watermark logger 440 to log the watermarks detected by the watermark detector 145 during the first (e.g., search) and/or second (e.g., confirmation) operating modes. In the illustrated example of FIG. 4, the watermark logger 440 reports the logged watermarks via the example network 135 to the example data processing facility 140 for further processing, as described above. For example, the watermark logger 440 may report the logged watermarks periodically (e.g., at specified reporting intervals), based on one or more events (e.g., such as when a log storage threshold is satisfied, when a query from the data processing facility 140 is received, etc.), etc.

While example manners of implementing the media device meter 125 are illustrated in FIGS. 1-4, one or more of the elements, processes and/or devices illustrated in FIGS. 1-4 may be combined, divided, re-arranged, omitted, eliminated and/or implemented in any other way. Further, the example watermark detector 145, the example watermark detector controller 150, the example sensor(s) 305, the example symbol buffer 405, the example watermark verifier 410, the example watermark confirmer 415, the example search trigger evaluator 420, the example quiet level evaluator 425, the example timer 430, the example back confirmer 435, the example watermark logger 440 and/or, more generally, the example media device meter 125 of FIGS. 1-4 may be implemented by hardware, software, firmware and/or any combination of hardware, software and/or firmware. Thus, for example, any of the example watermark detector 145, the example watermark detector controller 150, the example sensor(s) 305, the example symbol buffer 405, the example watermark verifier 410, the example watermark confirmer 415, the example search trigger evaluator 420, the example quiet level evaluator 425, the example timer 430, the example back confirmer 435, the example watermark logger 440 and/or, more generally, the example media device meter 125 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media device meter 125, the example watermark detector 145, the example watermark detector controller 150, the example sensor(s) 305, the example symbol buffer 405, the example watermark verifier 410, the example watermark confirmer 415, the example search trigger evaluator 420, the example quiet level evaluator 425, the example timer 430, the example back confirmer 435 and/or the example watermark logger 440 is/are hereby expressly defined to include a tangible computer readable storage device or storage disk such as a memory, a digital versatile disk (DVD), a compact disk (CD), a Blu-ray disk, etc. storing the software and/or firmware. Further still, the example media device meter 125 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the example media device meter 125, the example watermark detector 145, the example watermark detector controller 150, the example sensor(s) 305, the example symbol buffer 405, the example watermark verifier 410, the example watermark confirmer 415, the example search trigger evaluator 420, the example quiet level evaluator 425, the example timer 430, the example back confirmer 435 and/or the example watermark logger 440 are shown in FIGS. 5-12. In these examples, the machine readable instructions comprise one or more programs for execution by a processor, such as the processors 1312 and/or 1412 shown in the example processor platforms 1300 and 1400 discussed below in connection with FIGS. 13 and 14. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processors 1312 and/or 1412, but the entire program or programs and/or portions thereof could alternatively be executed by a device other than the processors 1312 and/or 1412, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5-12, many other methods of implementing the example media device meter 125, the example watermark detector 145, the example watermark detector controller 150, the example sensor(s) 305, the example symbol buffer 405, the example watermark verifier 410, the example watermark confirmer 415, the example search trigger evaluator 420, the example quiet level evaluator 425, the example timer 430, the example back confirmer 435 and/or the example watermark logger 440 may alternatively be used. For example, with reference to the flowcharts illustrated in FIGS. 5-12, the order of execution of the blocks may be changed, and/or some of the blocks described may be changed, eliminated, combined and/or subdivided into multiple blocks.

As mentioned above, the example processes of FIGS. 5-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-12 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 5:
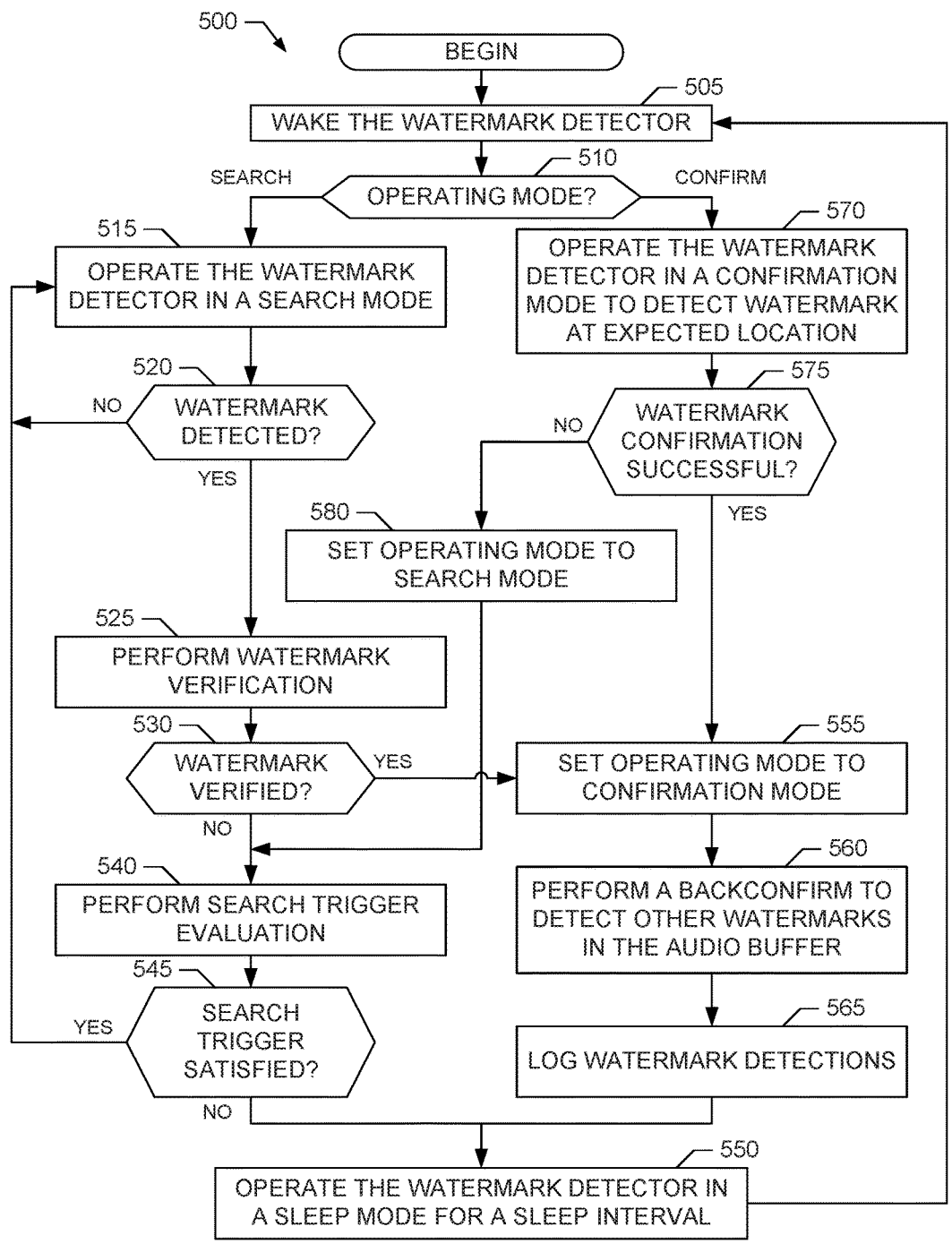
FIG. 5 is a flowchart representative of first example machine readable instructions that may be executed to implement the example media device monitor of FIGS. 1 and/or 3, and/or the example watermark detector controller of FIGS. 1, 3 and/or 4.

A first example program 500 that may be executed to implement the example media device meter 125 of FIGS. 1 and/or 3, and/or the example watermark detector controller 150 of FIGS. 1, 3 and/or 4, is represented by the flowchart shown in FIG. 5. With reference to the preceding figures and associated written descriptions, the example program 500 of FIG. 5 begins execution at block 505 at which the example timer 430 of the example watermark detector controller 150 wakes the example watermark detector 145 at the end of the current sleep interval. At block 510, the watermark detector controller 150 determines the current operating mode in which the watermark detector 145 has been configured to operate. If the current operating mode is the search operating mode (block 510), then at block 515 the example watermark verifier 410 of the watermark detector controller 150 causes the watermark detector 145 to operate (or continue to operate) in the search operating mode to detect watermarks in a monitored media signal output by the media device 110, and store the resulting measured watermark symbol values in the example symbol buffer 405, as described above. If a watermark is detected (block 520), processing proceeds to block 525. Otherwise, the watermark verifier 410 continues to operate the watermark detector 145 in the search mode.

Figure 6:
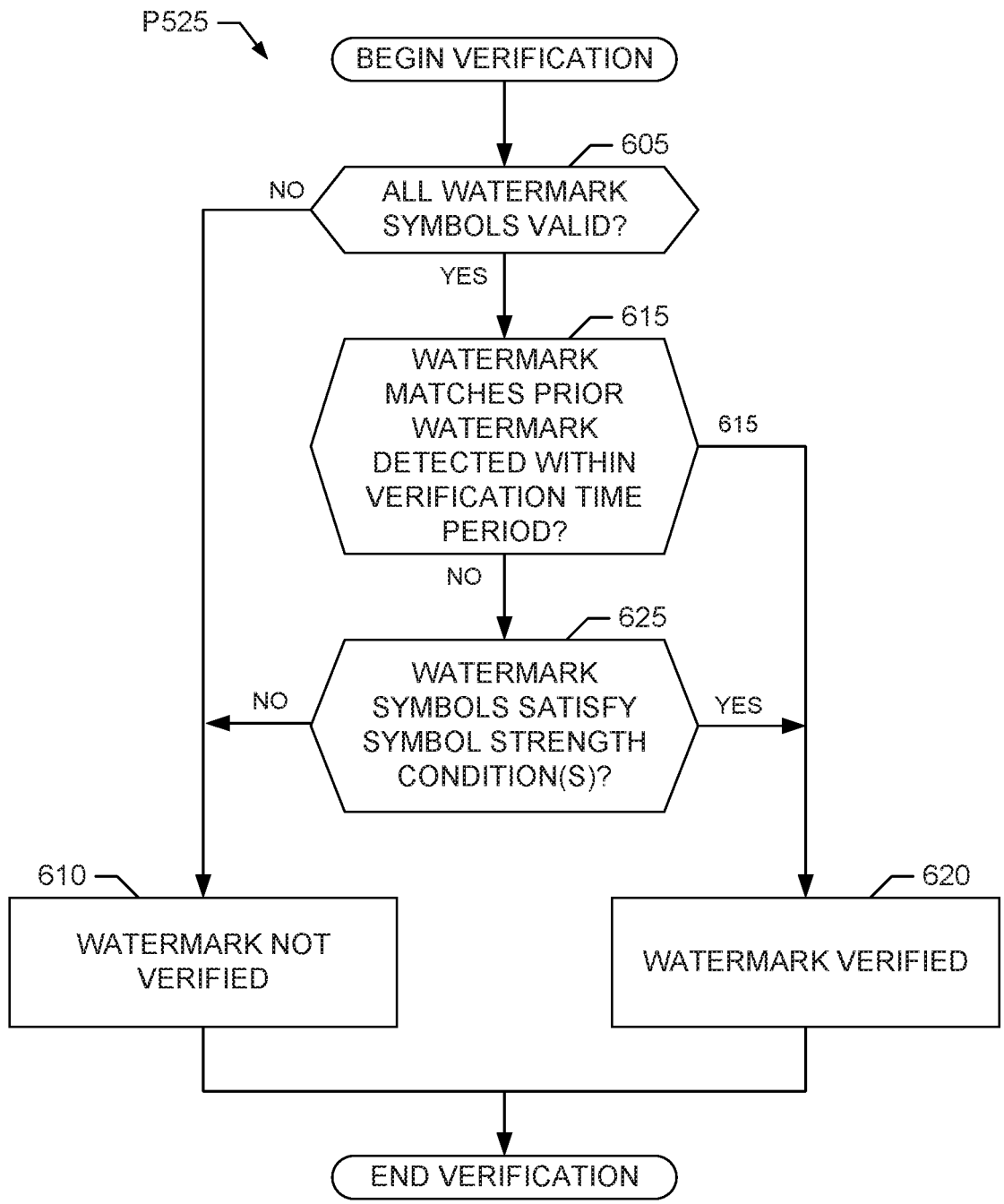
FIG. 6 is a flowchart representative of first example machine readable instructions that may be executed to implement the example watermark verifier of FIG. 4.
Figure 8:
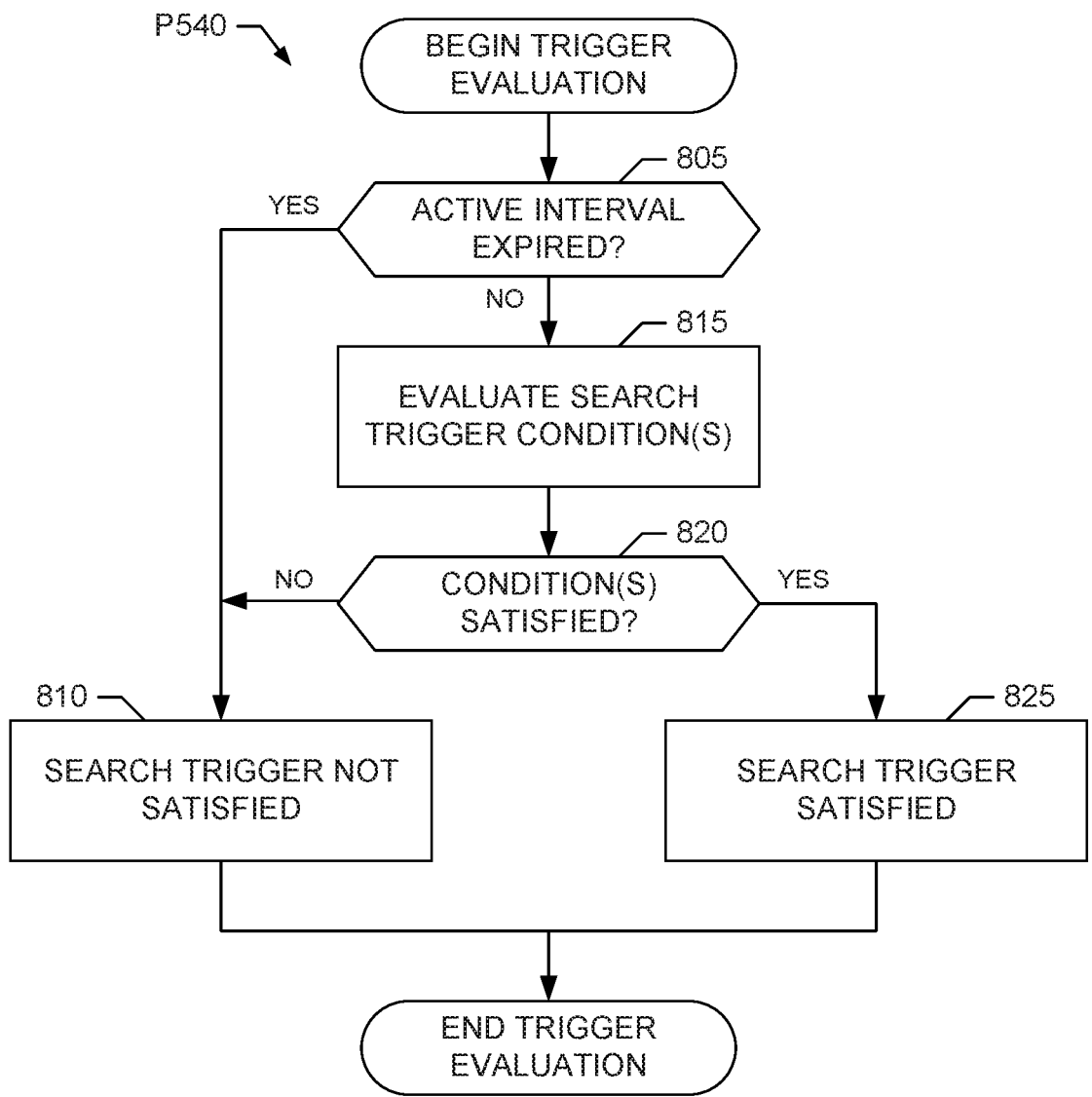
FIG. 8 is a flowchart representative of first example machine readable instructions that may be executed to implement the example search trigger evaluator of FIG. 4.

If a watermark is detected during search mode (block 520), at block 525 the watermark verifier 410 verifies the detected watermark, as described above. Example machine readable instructions that may be used to implement the processing at block 525 are illustrated in FIG. 6, which is described in further detail below. If the watermark verifier 410 determines the detected watermark is verified (block 530), processing proceeds to block 535 at which the watermark verifier 410 sets the operating mode of the watermark detector to the confirmation mode. Otherwise, processing proceeds to block 540 at which the example search trigger evaluator 420 of the example watermark detector controller 150 evaluates one or more search trigger conditions, as described above. Example machine readable instructions that may be used to implement the processing at block 540 are illustrated in FIG. 8, which is described in further detail below.

If the search trigger condition(s) evaluated at block 540 is(are) satisfied (block 545), processing returns to block 515 and blocks subsequent thereto at which the watermark verifier 410 continues to operate the watermark detector 145 in the search mode. Otherwise, processing proceeds to block 550 at which the watermark detector controller 150 places the watermark detector 145 in a sleep mode (e.g., or other low power operating mode, such as a standby mode, etc.) for a sleep interval (e.g., such as for a duration of 1 minute or some other duration). After the sleep interval expires, processing returns to block 505 and blocks subsequent thereto.

Returning to block 530, if the watermark verifier 410 determines the detected watermark is verified (block 530), processing proceeds to block 555 at which the watermark verifier 410 sets the operating mode of the watermark detector to the confirmation mode. At block 560, the example back confirmer 435 of the watermark detector controller 150 performs a backconfirm operation to search through the example symbol buffer 405 of the watermark detector controller 150 to detect other watermarks detected by the watermark detector 145 during the current active interval, as described above. At block 565, the example watermark logger 440 of the watermark detector controller 150 logs (and reports, if appropriate) the watermark(s) detected during the current active interval. Processing then proceeds to block 550 and blocks subsequent thereto, which are described in detail above.

Returning to block 510, if the current operating mode is the confirmation operating mode, then at block 570 the example watermark confirmer 415 of the watermark detector controller 150 operates (or continues to operate) the watermark detector 145 in the confirmation mode. In the confirmation mode, the watermark confirmer 415 causes the watermark detector 145 to cycle between a sleep interval and an active interval to detect subsequent watermarks at expected locations in the monitored media signal relative to the location of the first watermark detected and verified during the search operating mode, and store the resulting measured watermark symbol values in the example symbol buffer 405, as described above. As also noted above, the duration of the sleep interval employed in the confirmation mode may be the same as, or different from, the duration of the sleep interval employed in the sleep mode. Also, in some examples, the watermark detector controller 150 varies the duration of the sleep interval employed in the sleep mode and/or the confirmation mode depending on one or more criteria, such as based on time-of-day (e.g., with longer sleep intervals utilized during nighttime hours), detected media activity (e.g., with longer sleep intervals utilized when media signals have not be detected for a given interval of time). Additionally or alternatively, in some examples, the watermark detector controller 150 varies the sleep interval in a random or pseudo-random manner (e.g., by utilizing a random or pseudo-random number generator to determine the duration of the sleep interval). Example machine readable instructions that may be used to implement the processing at block 570 are illustrated in FIG. 7, which is described in further detail below.

At block 575, the watermark confirmer 415 determines whether a watermark was detected at block 570 (e.g., during the confirmation operating mode) and, thus, watermark confirmation was successful. If watermark confirmation was successful (block 575), processing proceeds to block 555 at which the operating mode remains as the confirmation mode. Processing then proceeds to block 560 and blocks subsequent thereto, which are described in detail above. However, if watermark confirmation was not successful (block 575), processing proceeds to block 580 at which the watermark confirmer 415 sets the operating mode of the watermark detector 145 back to the search operating mode. In some examples, at block 575 the watermark confirmer 415 causes the operating mode to remain in the confirmation mode (and, thus, does not proceed to block 580) for at least a given confirmation time period (e.g., 5 minutes or some other time period). In such examples, if the given confirmation time period elapses without watermark confirmation being successful, then processing proceeds to block 580 at which the watermark confirmer 415 sets the operating mode of the watermark detector 145 back to the search operating mode at block. Processing then proceeds to block 540 and blocks subsequent thereto, which are described in detail above.

A first example program P525 that may be executed to implement the example watermark verifier 410 of FIG. 4, and/or that may be used to perform the processing at block 525 of FIG. 5, is represented by the flowchart shown in FIG. 6. With reference to the preceding figures and associated written descriptions, the example program P525 of FIG. 6 begins execution at block 605 at which the watermark verifier 410 begins verifying a watermark, such as the example watermark 200, detected by the example watermark detector 145 during the search operating mode. For example, at block 605, the watermark verifier 410 determines whether all symbols in the current detected watermark are valid (e.g., have no errors). If all detected watermark symbols are not valid, control proceeds to block 610 at which the watermark verifier 410 indicates that the watermark has not been verified. However, if all detected watermark symbols are valid, control proceeds to block 615 at which the watermark verifier 410 determines whether the detected watermark matches a prior watermark detected within a verification time interval (e.g., which may be 5 minutes or some other duration). If at block 615 the detected watermark matches a prior watermark detected within the verification time interval (e.g., or if at least their repeating groups of media identification symbols 205 match), at block 620 the watermark verifier 410 indicates that the watermark has been verified. Otherwise, at block 625 the watermark verifier 410 determines whether the symbols of the watermark being verified satisfy one or more symbol strength condition(s). If the symbol strength condition(s) is(are) satisfied, at block 620 the watermark verifier 410 indicates that the watermark has been verified. Otherwise, at block 610 the watermark verifier 410 indicates that the watermark has not been verified.

Figure 7:
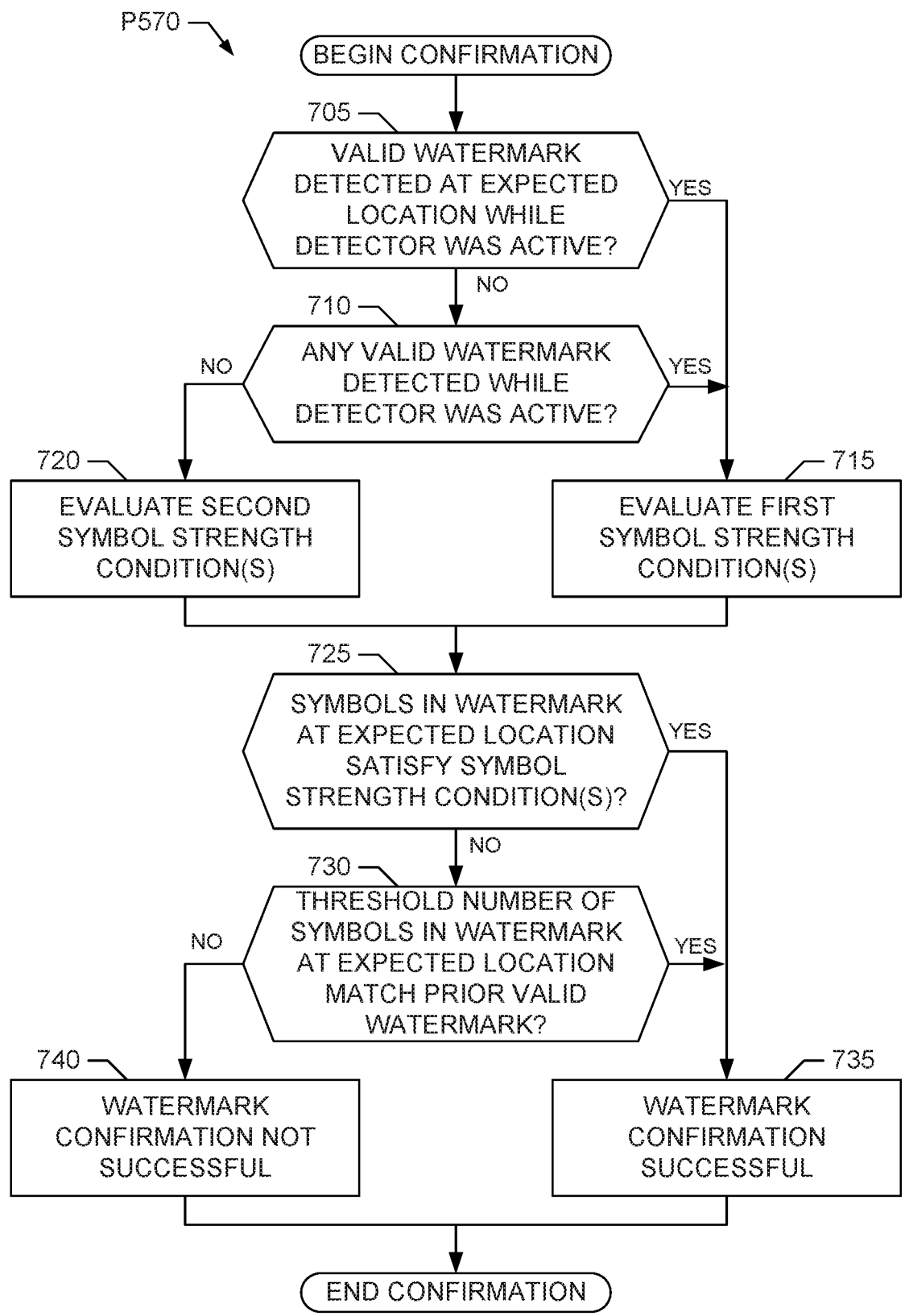
FIG. 7 is a flowchart representative of first example machine readable instructions that may be executed to implement the example watermark confirmer of FIG. 4.

A first example program P570 that may be executed to implement the example watermark confirmer 415 of FIG. 4, and/or that may be used to perform the processing at block 570 of FIG. 5, is represented by the flowchart shown in FIG. 7. With reference to the preceding figures and associated written descriptions, the example program P570 of FIG. 7 begins execution at block 705 at which the watermark confirmer 415 examines the example symbol buffer 405 to determine whether, when the watermark detector 145 was active, a valid watermark (e.g., an instance of the watermark 200 having a first group of code symbols 205 matching the first group of code symbols 205 in a prior detected instance of the watermark 200) was detected at the expected location in the monitored media signal. If a valid watermark was not detected (block 705), at block 710 the watermark confirmer 415 examines the example symbol buffer 405 to determine whether any valid watermark (e.g., at any location in the monitored media signal) was detected while the watermark detector 145 was active. If a valid watermark was identified at block 705 or block 710, processing proceeds to block 715 at which the watermark confirmer 415 evaluates a first set of one or more symbol strength conditions for the symbols of the valid watermark. For example, the first set of one or more symbol strength conditions may correspond to a first symbol strength threshold that is compared against the symbols of the valid watermark.

However, if a valid watermark was not identified at block 705 or block 710, processing proceeds to block 720 at which the watermark confirmer 415 evaluates a second set of one or more symbol strength conditions for the measured watermark symbols at the expected location in the media signal. For example, the second set of one or more symbol strength conditions may correspond to a second symbol strength threshold that is compared against the symbols of the valid watermark, with the second symbol strength threshold being higher than the first symbol strength threshold. At block 725, the watermark confirmer 415 determines whether the symbol strength condition(s) evaluated at blocks 715 or 720 was(were) satisfied by the watermark symbols examined. If the symbol strength condition(s) was(were) satisfied (block 725), at block 735 the watermark confirmer 415 determines watermark confirmation was successful. However, if the symbol strength condition(s) was(were) satisfied (block 725), at block 730 the watermark confirmer 415 determines whether at least a threshold number of the watermark symbols at the expected location (e.g., the first group of symbols 205 for an instance of the watermark 200 at the expected location) match the corresponding symbols in a prior valid watermark detected in the monitored media signal. If at least the threshold number of the watermark symbols match (block 730), processing proceeds to block 735 at which the watermark confirmer 415 determines watermark confirmation was successful. Otherwise, at block 740 the watermark confirmer 415 determines watermark confirmation was not successful.

A first example program P540 that may be executed to implement the example search trigger evaluator 420 of FIG. 4, and/or that may be used to perform the processing at block 540 of FIG. 5, is represented by the flowchart shown in FIG. 8. With reference to the preceding figures and associated written descriptions, the example program P540 of FIG. 8 begins execution at block 805 at which the search trigger evaluator 420 determines whether the current active interval in which the watermark detector 145 is to be active has expired. For example, the active interval may have a duration of 1 minute or some other value. If the active interval has expired, at block 810 the search trigger evaluator 420 indicates that the search trigger condition(s) has(have) not been satisfied. However, if the active interval has not expired, (block 805), at block 815 the search trigger evaluator 420 evaluates one or more search trigger conditions, as described above. If the search trigger condition(s) is(are) satisfied (block 820), at block 825 the search trigger evaluator 420 indicates that the search trigger condition(s) has (have) been satisfied. Otherwise, processing proceeds to block 810 at which the search trigger evaluator 420 indicates that the search trigger condition(s) has(have) not been satisfied.

Figure 9:
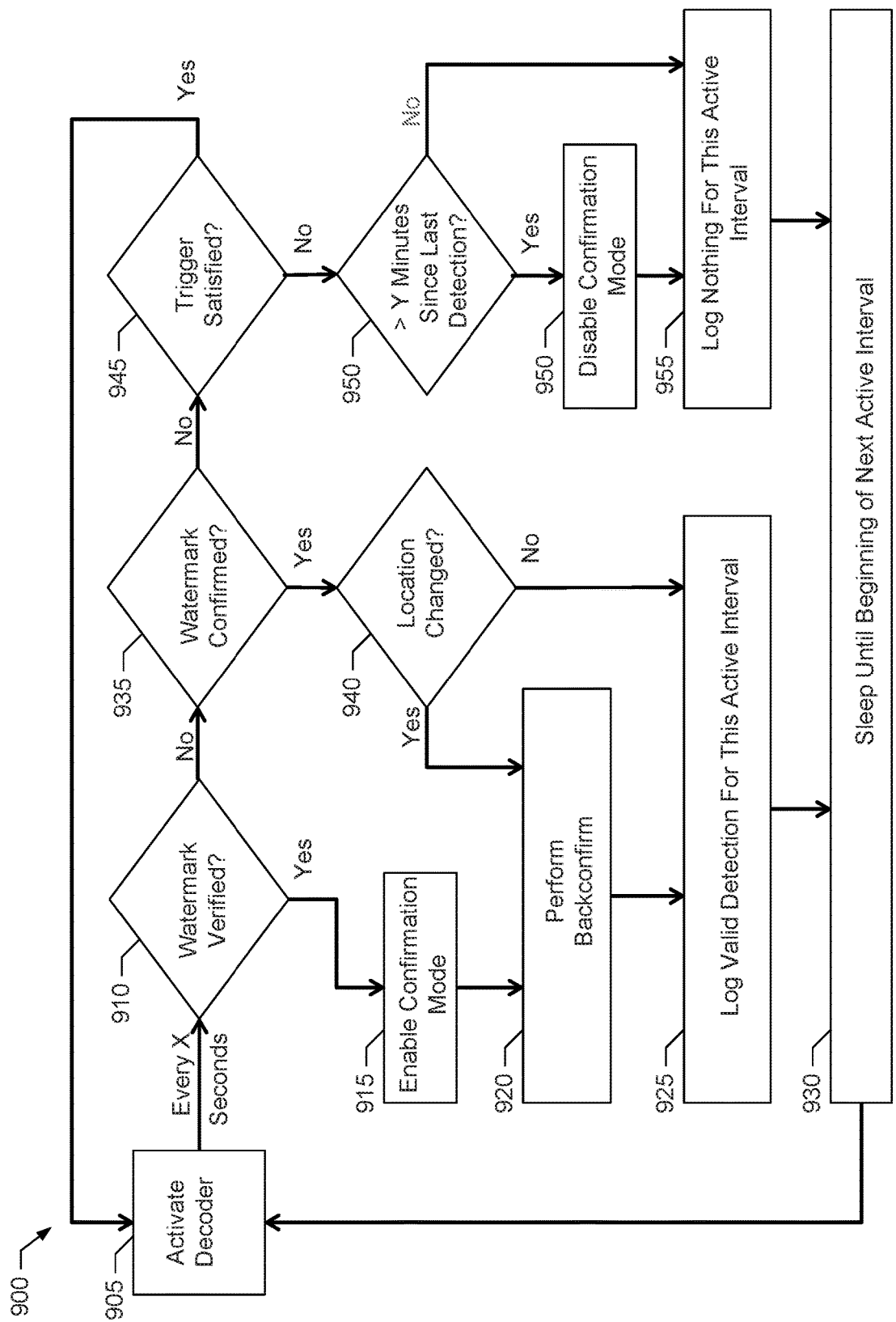
FIG. 9 is a flowchart representative of second example machine readable instructions that may be executed to implement the example media device monitor of FIGS. 1 and/or 3, and/or the example watermark detector controller of FIGS. 1, 3 and/or 4.

A second example program 900 that may be executed to implement the example media device meter 125 of FIGS. 1 and/or 3, and/or the example watermark detector controller 150 of FIGS. 1, 3 and/or 4, is represented by the flowchart shown in FIG. 9. The second example program 900 is tailored for scenarios in which the watermark detector 145 is to detect watermarks corresponding to the example watermark 200 of FIG. 2. With reference to the preceding figures and associated written descriptions, the example program 900 of FIG. 9 begins execution at block 905 at which the watermark detector controller 150 activates the example watermark detector 145 of the media device meter 125, which causes the watermark detector 145 to store measured watermark symbol values in the example symbol buffer 405. At block 910, the example watermark verifier 410 determines whether a verified watermark was detected, as described above. If a verified watermark was detected (block 910), processing proceeds to block 915 at which, if the current operating mode is the search mode, the watermark verifier 410 transitions the operating mode to the confirmation mode. Otherwise, if the current operating mode is the confirmation mode, at block 915 the operating mode remains in the confirmation mode. As such, in the illustrated example of FIG. 9, the watermark verifier 410 performs watermark verification in both the search and confirmation operating modes, and processing proceeds to block 920 if watermark verification is successful in either the search or confirmation operating modes.

At block 920, the example back confirmer 435 of the watermark detector controller 150 performs a backconfirm operation to search through the example symbol buffer 405 of the watermark detector controller 150 to detect other watermarks detected by the watermark detector 145 during the current active interval, as described above. At block 925, the example watermark logger 440 of the watermark detector controller 150 logs (and reports, if appropriate) the watermark(s) detected during the current active interval. Processing then proceeds to block 930 at which the watermark detector controller 150 places the watermark detector 145 in a sleep mode (e.g., or other low power operating mode, such as a standby mode, etc.) for a sleep interval (e.g., such as for a duration of 1 minute or some other duration), after which the watermark detector 145 is woken and processing returns to block 905 and blocks subsequent thereto.

Returning to block 910, if a verified watermark was not detected, processing proceeds to block 935. At block 935, the example watermark confirmer 415 determines whether the current operating mode is the confirmation mode and, if so, whether a watermark confirmation was successful. If the current operating mode is the confirmation mode and watermark confirmation was successful (block 935), processing proceeds to block 940. At block 940, the watermark confirmer 415 examines the location of the most recent watermark detected during the confirmation operating mode. If the watermark occurred at the expected location in the media signal (e.g., based on the duration and repetition interval of the watermark 200), processing proceeds from block 940 to block 925 at which the example watermark logger 440 of the watermark detector controller 150 logs (and reports, if appropriate) the watermark(s) detected during the current active interval. Otherwise, if the location of the detected watermark has changed from the expected location (block 940), processing proceeds to block 920 at which the back confirmer 435 performs the backconfirm operation described above before processing then proceeds to block 925. Processing then proceeds to block 930 and blocks subsequent thereto, which are described above.

Returning to block 935, if the current operating mode is not the confirmation mode, or watermark confirmation was not successful, processing proceeds to block 945. At block 945, the example search trigger evaluator 420 evaluates one or more search trigger conditions, as described above. If the search trigger condition(s) is(are) not satisfied (block 945), at block 950 the search trigger evaluator 420 determines whether a time period (e.g., Y minutes, where Y is equal to 5 or some other value) has elapsed since the last watermark was detected. If the time period has elapsed, the search trigger evaluator 420 disables confirmation mode (if it was enabled), and causes the operating mode to transition to (or remain in) the search operating mode. As no watermarks have been detected, nothing is logged for the current active interval (block 955). Processing then proceeds to block 930 and blocks subsequent thereto, which are described above.

Returning to block 945, if the search trigger condition(s) is(are) satisfied (block 945), processing returns to block 905 and blocks subsequent thereto at which the watermark detector controller 150 evaluates the watermark symbols detected during the next active period. As indicated in the illustrated example of FIG. 9, if the search trigger condition(s) is(are) satisfied, subsequent processing iterations will continue every X seconds, where X corresponds to, for example, the duration of the example watermark 200 (e.g., X=4.8 seconds, or some other value).

Figure 10:
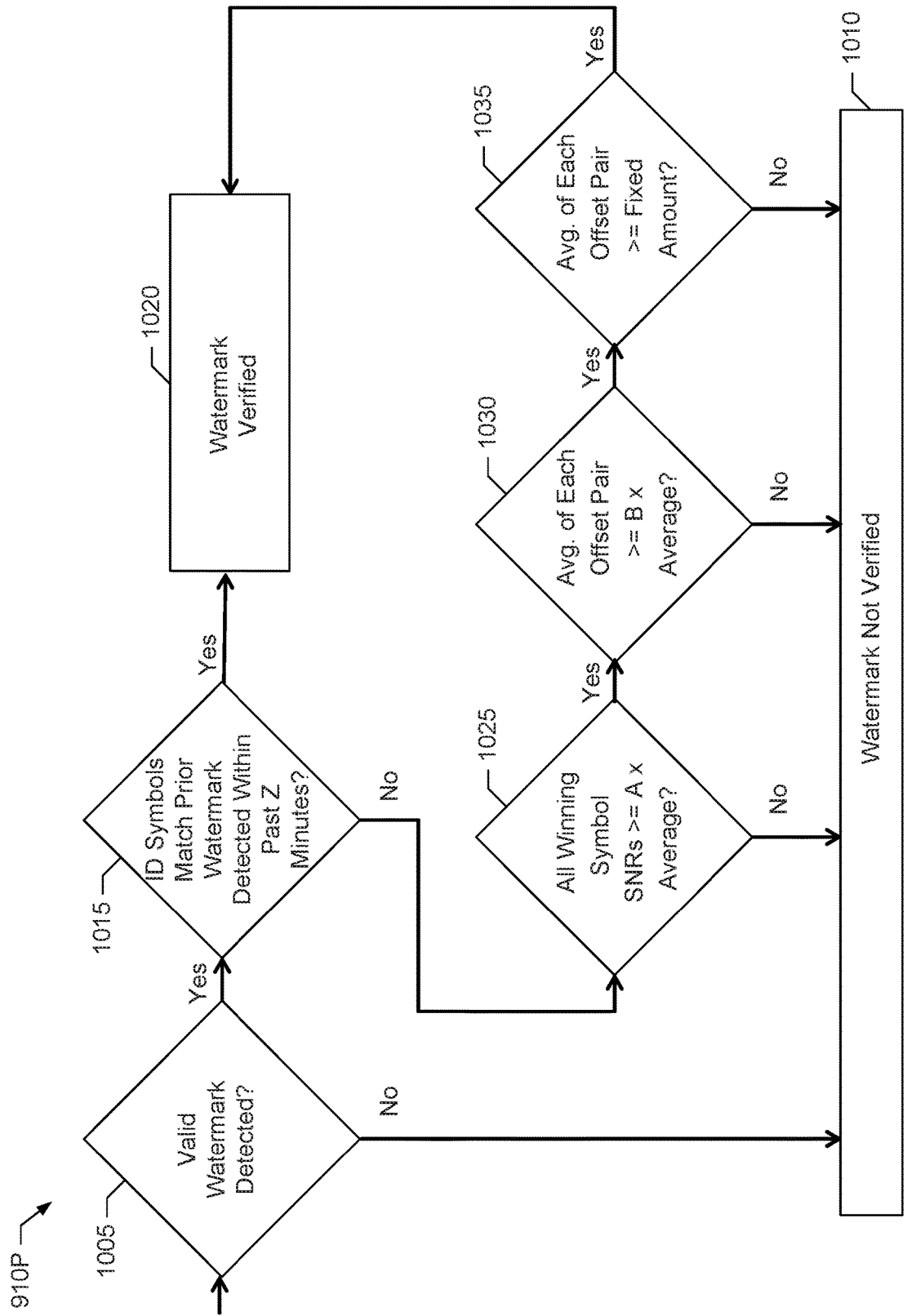
FIG. 10 is a flowchart representative of second example machine readable instructions that may be executed to implement the example watermark verifier of FIG. 4.

A second example program 910P that may be executed to implement the example watermark verifier 410 of FIG. 4, and/or that may be used to perform the processing at block 910 of FIG. 9, is represented by the flowchart shown in FIG. 10. The second example program 910P is tailored for scenarios in which the watermark detector 145 is to detect watermarks corresponding to the example watermark 200 of FIG. 2. With reference to the preceding figures and associated written descriptions, the example program 910P of FIG. 9 begins execution at block 1005 at which the watermark verifier 410 determines whether a valid watermark (e.g., a watermark with no symbol errors) was detected. For example, the watermark detector 145 may indicate that a detected watermark is valid when the detected watermark satisfies an error detection test. As described above, if the watermark detector 145 outputs a valid detected watermark, the watermark verifier 410 performs further processing to verify the validity of the watermark before permitting power efficient watermark detection, as disclosed herein, to proceed further. Conversely, if a valid watermark was not detected by the watermark detector 145 (block 1005), at block 1010 the watermark verifier 410 indicates that watermark verification was unsuccessful as there is no valid watermark to verify.

However, if a valid watermark was detected (block 1005), then at block 1015 the watermark verifier 410 determines whether the first group of media identification symbols 205 of the currently detected watermark match the first group of media identification symbols 205 of a prior watermark detected within a verification time interval (e.g., such as Z minutes, where Z=5 or some other value). If the first group of media identification symbols 205 match (block 1015), then at block 1020 the watermark verifier 410 indicates that watermark verification was successful. If, however, the first group of media identification symbols 205 do not match (block 1015), the watermark verifier 410 evaluates three symbol strength conditions in the illustrated example.

For example, at block 1025, the watermark verifier 410 determines whether the signal-to-noise ratios (SNRs) of the detected first group of media identification symbols 205 satisfy a first validation threshold. For example, the first validation threshold at block 1025 can be a multiple (e.g., A, where A=2 or some other value) of the average SNR for all possible symbol values measured by the watermark detector 145 when decoding the watermark. At block 1030, the watermark verifier 410 determines whether the average of the combined SNR of each offset pair (see above for a description of offset pairs) in the first group of media identification symbols 205 satisfy a second validation threshold, which may be the same or different from the first validation threshold used at block 1025. For example, the second validation threshold at block 1030 can be a multiple (e.g., B, where B=4.2 or some other value) of the average SNR for all possible symbol values measured by the watermark detector 145 when decoding the watermark. At block 1035, the watermark verifier 410 determines whether the average of the combined SNR of each offset pair (see above for a description of offset pairs) in the first group of media identification symbols 205 satisfy a third validation threshold, which may be the same or different from the first and/or second validation thresholds. For example, the third validation threshold at block 1030 can be fixed value (e.g., not a function of the symbol SNRs), which is preset, programmable, etc.

In the illustrated example, if all three symbol strength conditions evaluated at block 1025, 1030 and 1035 are satisfied, processing proceeds to block 1020 at which the watermark verifier 410 indicates that watermark verification was successful. Otherwise, processing proceeds to block 1010 at which the watermark verifier 410 indicates that watermark verification was unsuccessful. However, in other examples, processing proceeds to block 1020, at which the watermark verifier 410 indicates that watermark verification was successful, if a subset of one or more of the conditions evaluated at block 1025, 1030 and 1035 are satisfied.

Figure 11:
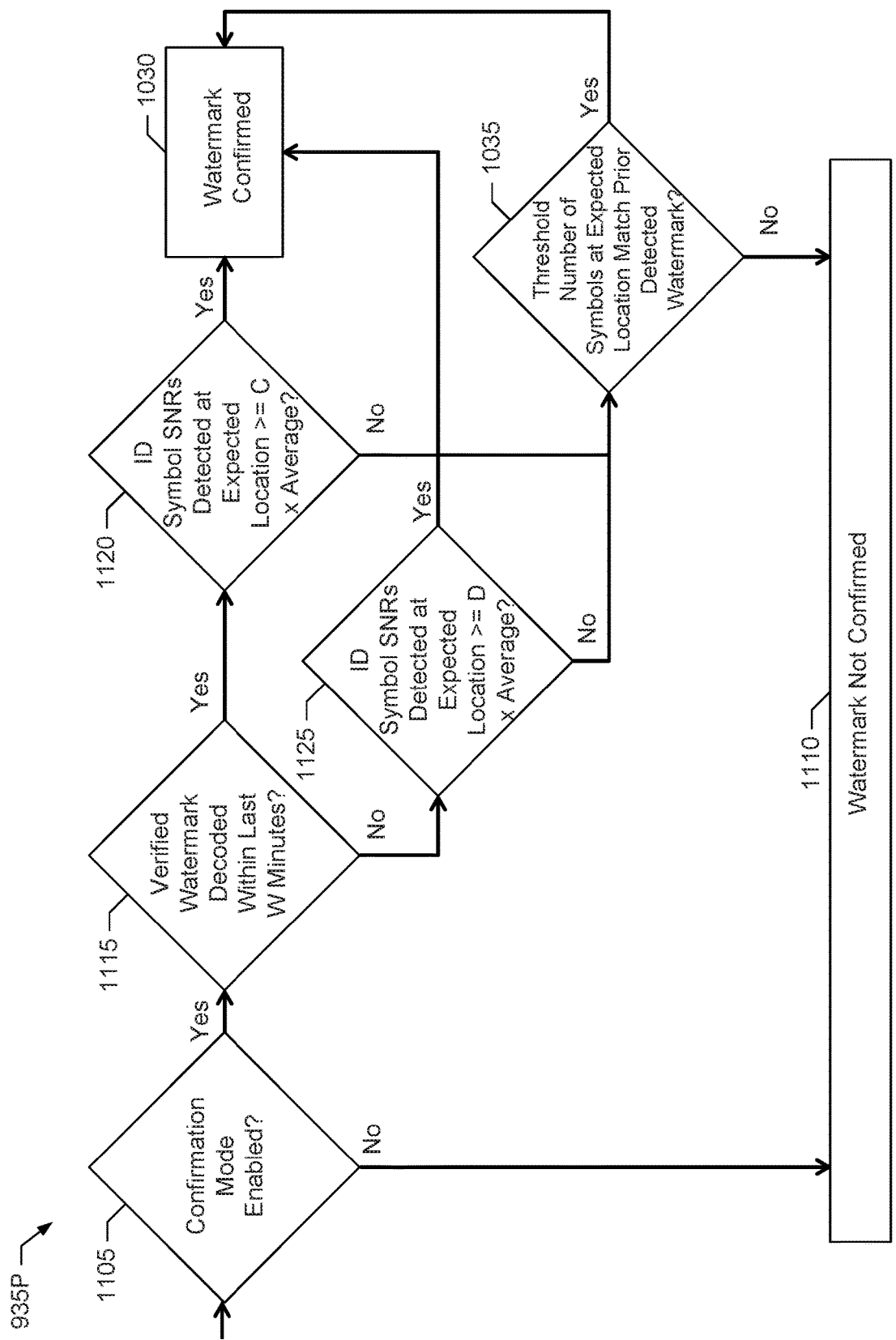
FIG. 11 is a flowchart representative of second example machine readable instructions that may be executed to implement the example watermark confirmer of FIG. 4.

A second example program 935P that may be executed to implement the example watermark confirmer 415 of FIG. 4, and/or that may be used to perform the processing at block 935 of FIG. 9, is represented by the flowchart shown in FIG. 11. The second example program 935P is tailored for scenarios in which the watermark detector 145 is to detect watermarks corresponding to the example watermark 200 of FIG. 2. With reference to the preceding figures and associated written descriptions, the example program 935P of FIG. 11 begins execution at block 1105 at which the watermark confirmer 415 determines whether the current operating mode is the confirmation mode. If the current operating mode is not the confirmation mode (block 1105), then at block 1110 the watermark confirmer 415 indicates that watermark confirmation was unsuccessful. However, if the current operating mode is the confirmation mode (block 1105), then at block 1115 the watermark confirmer 415 determines whether a verified watermark was detected within a confirmation time interval (e.g., such as within the past W minutes, where W=5 or some other value). If a verified watermark was detected within the confirmation time interval (block 1115), then at block 1120 the watermark confirmer 415 evaluates a first symbol strength condition. Otherwise, at block 1125, the watermark confirmer 415 evaluates a second symbol strength condition For example, at block 1120, the watermark confirmer 415 determines whether the first group of media identification symbols 205 detected at the expected location in the monitored media signal satisfy a first confirmation threshold. For example, the first confirmation threshold at block 1120 can be a multiple (e.g., C, where C=1.9 or some other value) of the average SNR for all possible symbol values measured by the watermark detector 145 when decoding the watermark at the expected location. At block 1125, the watermark confirmer 415 determines whether the first group of media identification symbols 205 detected at the expected location in the monitored media signal satisfy a second confirmation threshold, which may be larger than the first confirmation threshold. For example, the second confirmation threshold at block 1120 can be a multiple (e.g., D, where D=2.7 or some other value) of the average SNR for all possible symbol values measured by the watermark detector 145 when decoding the watermark at the expected location.

In the illustrated example, if either of the symbol strength conditions evaluated at blocks 1120 or 1125 are satisfied, processing proceeds to block 1030 at which the watermark confirmer 415 indicates that watermark confirmation was successful. Otherwise, processing proceeds to block 1035 at which the watermark confirmer 415 determines whether at least a threshold number of the first group of media identification symbols 205 detected at the expected location in the monitored media signal match the first group of media identification symbols 205 of a prior instance of the watermark 200 detected in the media signal. If at least the threshold number of the first group of media identification symbols 205 match (block 1035), then processing proceeds to block 1030 at which the watermark confirmer 415 indicates that watermark confirmation was successful. Otherwise, proceeds to block 1010 at which the watermark confirmer 415 indicates that watermark confirmation was unsuccessful.

Figure 12:
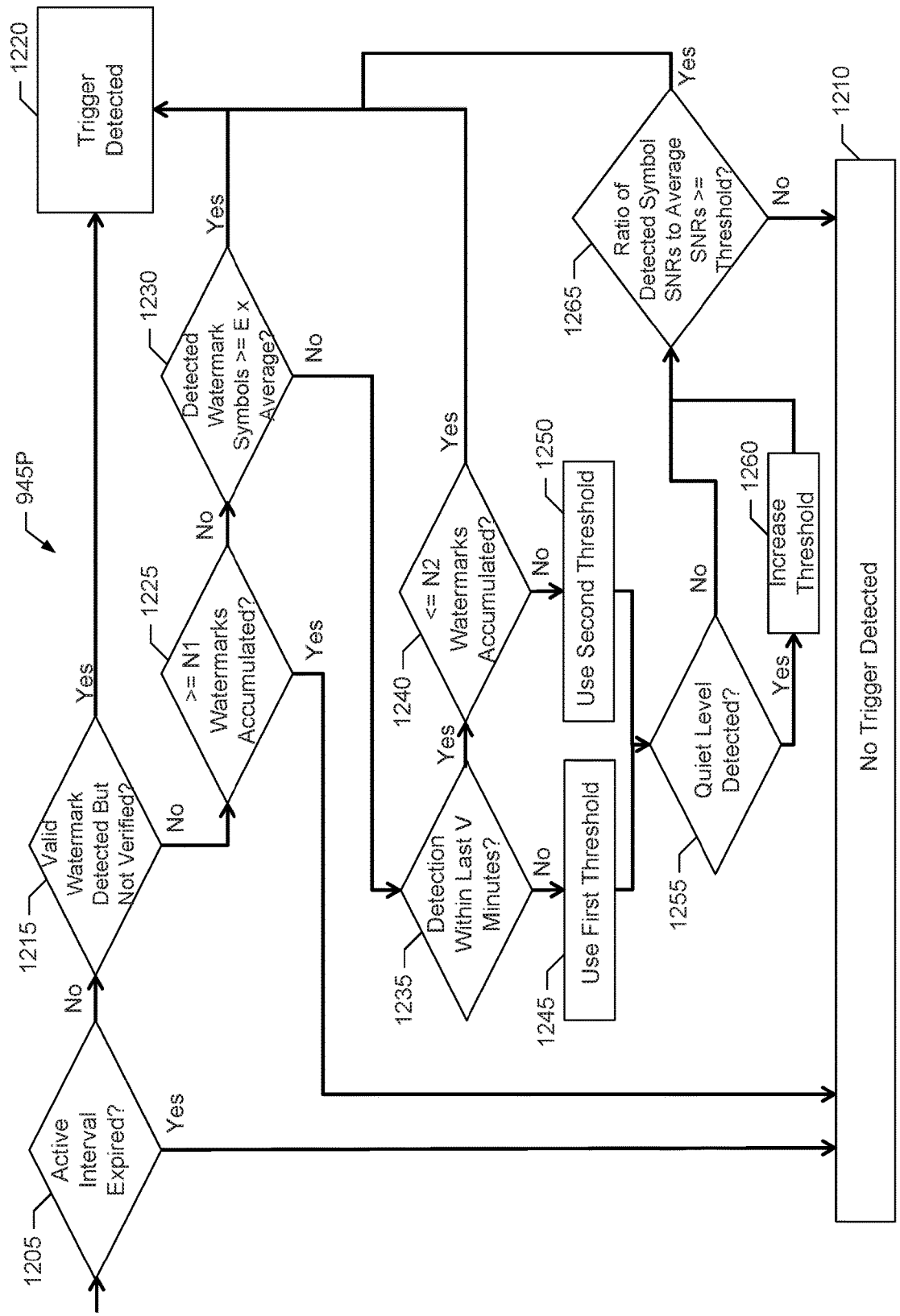
FIG. 12 is a flowchart representative of second example machine readable instructions that may be executed to implement the example search trigger evaluator of FIG. 4.

A second example program 945P that may be executed to implement the example search trigger evaluator 420 of FIG. 4, and/or that may be used to perform the processing at block 945 of FIG. 9, is represented by the flowchart shown in FIG. 12. The second example program 945P is tailored for scenarios in which the watermark detector 145 is to detect watermarks corresponding to the example watermark 200 of FIG. 2. With reference to the preceding figures and associated written descriptions, the example program 945P of FIG. 12 begins execution at block 1205 at which the search trigger evaluator 420 determines whether the current active interval has expired. If the current active interval has expired (block 1205), at block 1210 the search trigger evaluator 420 indicates that the search trigger is not satisfied.

However, if the current active interval has not expired (block 1205), at block 1215 the search trigger evaluator 420 determines whether a valid watermark was detected by the watermark detector 145, but did not satisfy the verification condition(s). If a valid watermark was detected, but did not satisfy the verification condition(s) (block 1215), at block 1220 the search trigger evaluator 420 indicates that the search trigger is satisfied.

However, if a valid watermark was not detected by the watermark detector 145 (block 1215), processing proceeds to block 1225 at which the search trigger evaluator 420 determines whether a first number (N1=10 or some other value) of symbols from adjacent watermark locations have been accumulated. Because in the illustrated example the instances of the watermark 200 are repeatedly embedded in the media signal for particular media such that the first group of the media identification symbols 205 in each embedded watermark instance is the same, the first group of the media identification symbols 205 from different watermark locations can be accumulated to increase the likelihood of successful detection. If the first number of symbols from adjacent watermark locations has already been accumulated (block 1225), then at block 1210 the search trigger evaluator 420 indicates that the search trigger is not satisfied.

However, if the first number of symbols from adjacent watermark locations has not already been accumulated (block 1225), then at block 1230 the search trigger evaluator 420 determines whether the SNRs for the detected watermark symbols satisfy a first trigger threshold. For example, the first trigger threshold at block 1230 can be a multiple (e.g., E, where E=1.9 or some other value) of the average SNR for all possible symbol values measured by the watermark detector 145 when decoding the watermark. If the symbol strength condition evaluated at block 1230 is satisfied, processing proceeds to block 1220 at which the search trigger evaluator 420 indicates that the search trigger is satisfied.

However, if the symbol strength condition evaluated at block 1230 is not satisfied, at block 1235 the search trigger evaluator 420 determines whether a watermark was detected within a search trigger interval (e.g., such as V minutes, where V=5 or some other value). If a watermark was detected within the search trigger interval (block 1235), then at block 1240 the search trigger evaluator 420 determines whether no more than a second number (N2=3 or some other value) of symbols from adjacent watermark locations have been accumulated. If no more than the second number of symbols from adjacent watermark locations have been accumulated (block 1240), then processing proceeds to block 1220 at which the search trigger evaluator 420 indicates that the search trigger is satisfied. Otherwise, at blocks 1245 or block 1250, the search trigger evaluator 420 configures either a first threshold or a second threshold to be used by the quiet level evaluator 425. For example, the first threshold configured at block 1245 when there has been no watermark detected within the search trigger interval may be higher than the second threshold configured at block 1250 when more than the second number of symbols from adjacent watermark locations have been accumulated.

At block 1255, the quiet level evaluator 425 processes audio samples received from, for example, the example sensor(s) 305 of the example media device meter 125 to determine whether the strength (e.g., amplitude, power, energy, etc.) of the audio samples obtained from the sensor(s) 305 indicates that the measured audio is quiet, as described above. If the quiet level evaluator 425 determines that the measured audio is quiet, at block 1260 the search trigger evaluator 420 increases the threshold used by the quiet level evaluator 425. At block 1265, the search trigger evaluator 420 determines whether a ratio (e.g., division) of the SNRs for the detected watermark symbols to an average SNR for all possible symbol values measured by the watermark detector 145 when decoding the watermark satisfies a threshold. If the threshold is satisfied (block 1265), processing proceeds to block 1220 at which the search trigger evaluator 420 indicates that the search trigger is satisfied. Otherwise, processing proceeds to block 1210 at which the search trigger evaluator 420 indicates that the search trigger is not satisfied.

Figure 13:
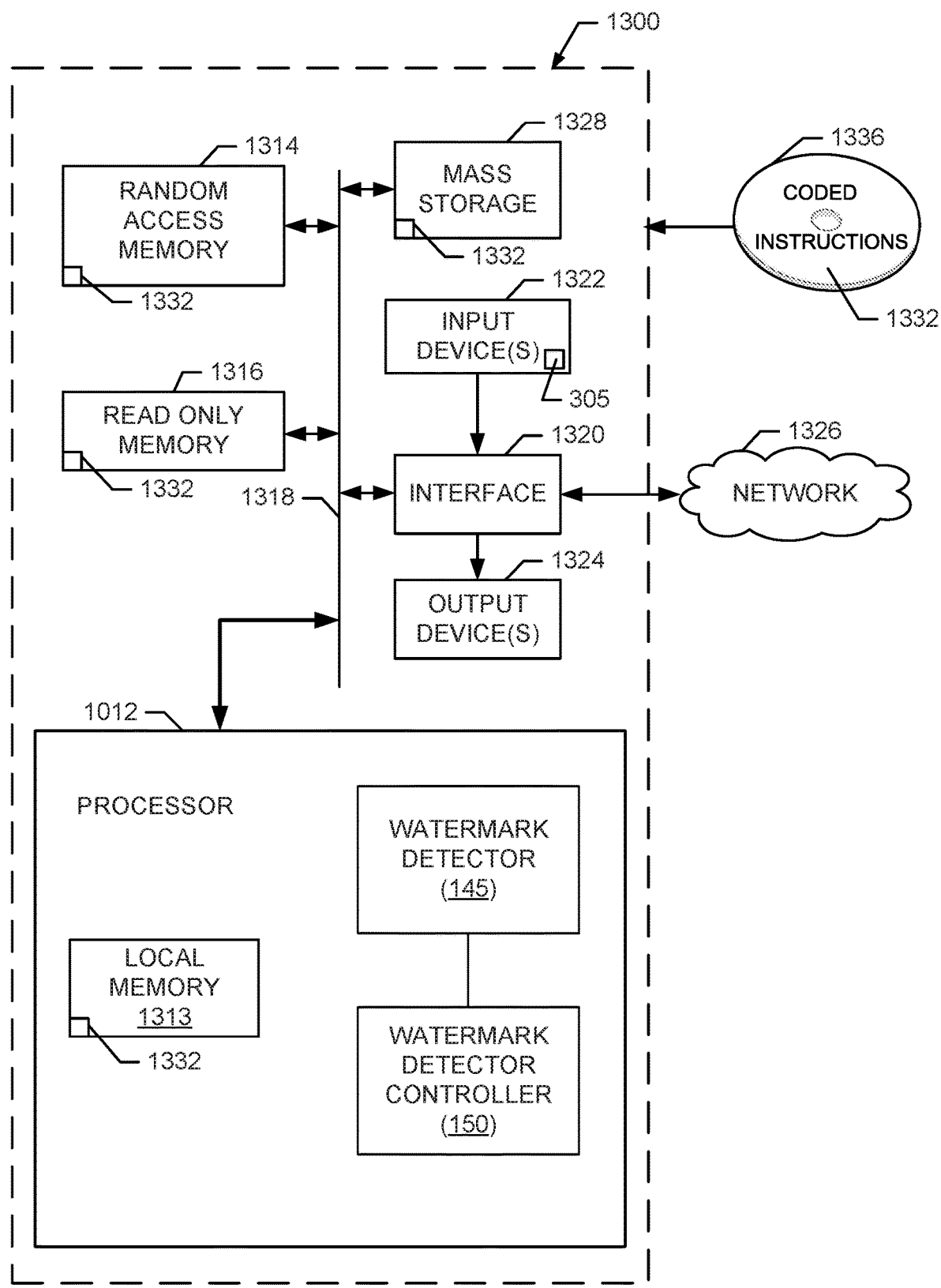
FIG. 13 is a block diagram of an example processor platform structured to execute the example machine readable instructions of FIGS. 5 and/or 9 to implement the example media device monitor of FIGS. 1 and/or 3.

FIG. 13 is a block diagram of an example processor platform 1300 structured to execute the instructions of FIGS. 5 and/or 9 to implement the example media device meter 125 of FIGS. 1 and/or 3. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example of FIG. 13, the processor 1312 is configured via example instructions 1332 to implement the example media device meter 125, the example watermark detector 145 and/or the example watermark detector controller 150 of FIGS. 1 and/or 3.

The processor 1312 of the illustrated example includes a local memory 1313 (e.g., a cache). The processor 1312 of the illustrated example is in communication with a main memory including a volatile memory 1314 and a non-volatile memory 1316 via a link 1318. The link 1318 may be implemented by a bus, one or more point-to-point connections, etc., or a combination thereof. The volatile memory 1314 may be implemented by Synchronous Dynamic Random Access Memory (SDRAM), Dynamic Random Access Memory (DRAM), RAIVIBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1300, can allow the user to control the computer system and provide data to the computer using physical gestures, such as, but not limited to, hand or body movements, facial expressions, and face recognition. In the illustrated example of FIG. 13, the input device(s) 1322 include the example sensor(s) 305.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID (redundant array of independent disks) systems, and digital versatile disk (DVD) drives.

Coded instructions 1332 corresponding to the instructions of FIGS. 5 and/or 9 may be stored in the mass storage device 1328, in the volatile memory 1314, in the non-volatile memory 1316, in the local memory 1313 and/or on a removable tangible computer readable storage medium, such as a CD or DVD 1336.

Figure 14:
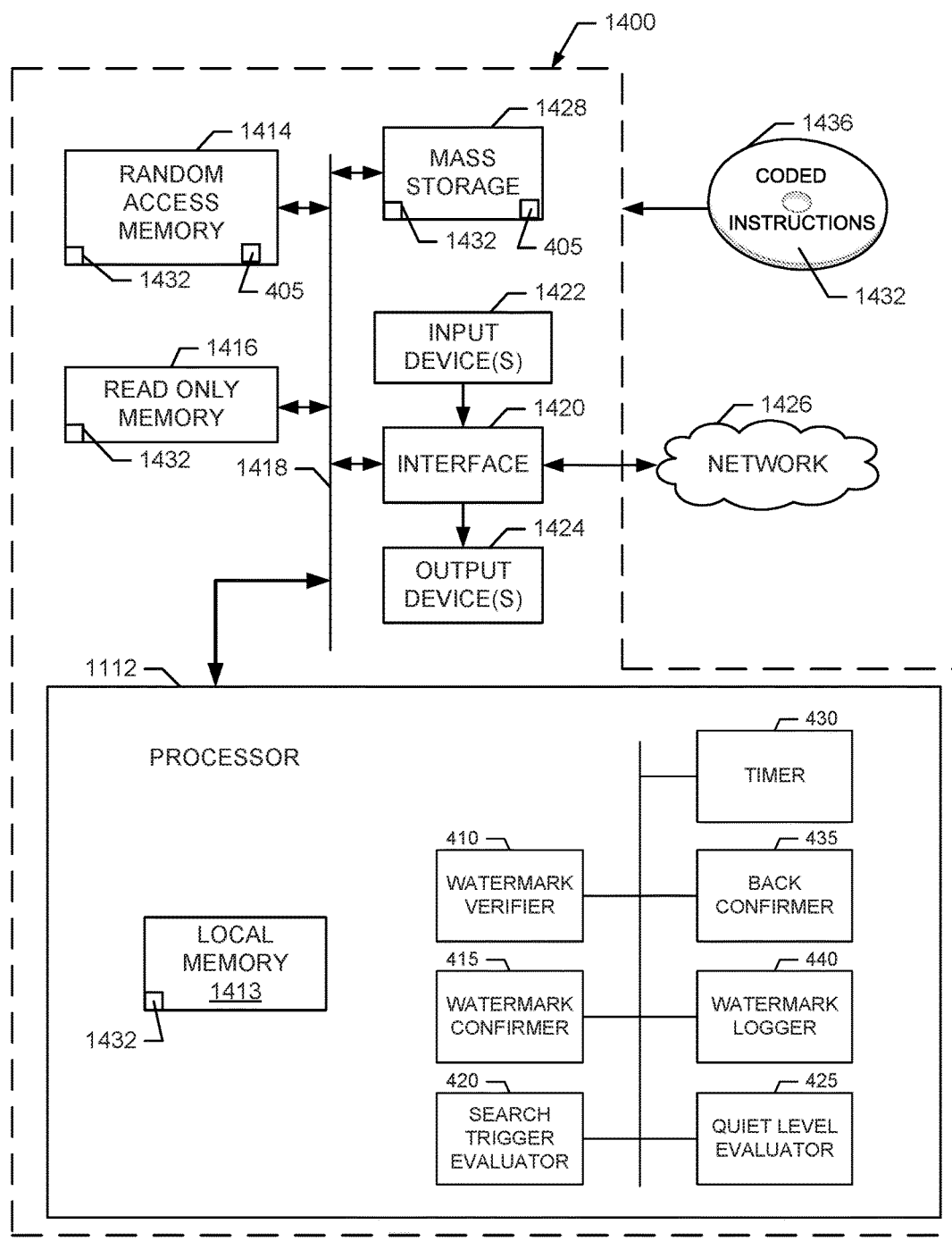
FIG. 14 is a block diagram of an example processor platform structured to execute the example machine readable instructions of FIGS. 5-11 and/or 12 to implement the example watermark detector controller of FIGS. 1, 3 and/or 4.

FIG. 14 is a block diagram of an example processor platform 1400 structured to execute the instructions of FIGS. 5-11 and/or 12 to implement the example watermark detector controller 150 of FIGS. 1, 3 and/or 4. The processor platform 1400 can be, for example, a server, a personal computer, a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box a digital camera, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. In the illustrated example of FIG. 14, the processor 1412 is configured via example instructions 1432 to implement the example watermark detector controller 150, the example watermark verifier 410, the example watermark confirmer 415, the example search trigger evaluator 420, the example quiet level evaluator 425, the example timer 430, the example back confirmer 435, the example watermark logger 440 of FIGS. 1, 3 and/or 4.

The processor 1412 of the illustrated example includes a local memory 1413 (e.g., a cache). The processor 1412 of the illustrated example is in communication with a main memory including a volatile memory 1414 and a non-volatile memory 1416 via a link 1418. The link 1418 may be implemented by a bus, one or more point-to-point connections, etc., or a combination thereof. The volatile memory 1414 may be implemented by SDRAM, DRAM, RDRAM and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a USB, and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1400, can allow the user to control the computer system and provide data to the computer using physical gestures, such as, but not limited to, hand or body movements, facial expressions, and face recognition.

One or more output devices 1424 are also connected to the interface circuit 1420 of the illustrated example. The output devices 1424 can be implemented, for example, by display devices (e.g., a LED, an OLED, a liquid crystal display, a CRT display, a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a DSL, a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and DVD drives. In some examples, the mass storage device 1428 may implement the example symbol buffer 405. Additionally or alternatively, in some examples the volatile memory 1414 may implement the example symbol buffer 405.

Coded instructions 1432 corresponding to the instructions of FIGS. 5-11 and/or 12 may be stored in the mass storage device 1428, in the volatile memory 1414, in the non-volatile memory 1416, in the local memory 1413 and/or on a removable tangible computer readable storage medium, such as a CD or DVD 1436.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A metering apparatus comprising:
   detector means for detecting watermarks in a media signal; and
   controller means for operating the detector means to (1) detect a first watermark in the media signal, and (2) cycle between sleep intervals and active intervals based on a repetition rate of the watermarks in the media signal to perform a detection operation for a second watermark at a second location in the media signal relative to a first location of the first watermark in the media signal, the controller means to cycle the detector means between the sleep intervals and the active intervals in response to the first watermark being verified, the controller means to search a buffer of prior detected watermark symbols to detect a third watermark at a third location prior to the second location in the media signal in response to the second watermark not being detected at the second location in the media signal.

2. The metering apparatus of claim 1, wherein the controller means is to place the detector means in a sleep mode during the sleep intervals by at least one of asserting a control input, disabling power to the detector means or preventing the detector means from being invoked.

3. The metering apparatus of claim 1, wherein the controller means is to determine the first watermark is verified when a first group of symbols of the first watermark matches a corresponding first group of symbols of a prior fourth watermark detected by the detector means in the media signal.

4. The metering apparatus of claim 3, wherein the first group of symbols of the first watermark and the corresponding first group of symbols of the fourth watermark include media identification symbols that are the same in the first and fourth watermarks.

5. The metering apparatus of claim 4, wherein the first watermark further includes a second group of symbols that is different from a corresponding second group of symbols of the fourth watermark.

6. A metering apparatus comprising:
   detector means for detecting watermarks in a media signal; and
   controller means for:
      activating the detector means to begin a first search interval;
      placing the detector means in a sleep mode upon expiration of the first search interval in response to no valid watermarks being detected during the first search interval;
      placing the detector means in the sleep mode prior to expiration of the first search interval in response to detection of a first valid watermark during the first search interval;
      activating the detector means to begin a second search interval upon expiration of a first sleep interval after the detector means was placed in the sleep mode;
      cycling the detector means between subsequent sleep intervals and active intervals to perform a detection operation for subsequent watermarks in the media signal after the first valid watermark is detected during the first search interval, the active intervals based on expected locations of the subsequent watermarks in the media signal; and
      searching a buffer of prior detected watermark symbols to detect a second watermark at a location prior to a first one of the expected locations in the media signal in response to no watermark being detected at the first one of the expected locations in the media signal.

7. The metering apparatus of claim 6, wherein the expected locations of the subsequent watermarks are based on a repetition rate associated with the subsequent watermarks.

8. The metering apparatus of claim 6, wherein the subsequent sleep intervals have different durations than the first sleep interval.

9. The metering apparatus of claim 6, wherein the controller means is to place the detector means in the sleep mode by at least one of asserting a control input, disabling power to the detector means or preventing the detector means from being invoked.

10. An apparatus comprising:
- detector means for detecting watermarks in a media signal; and
- controller means for:
  - operating the detector means to search for a first watermark in a media signal;
  - determining whether the first watermark satisfies a first condition in response to the first watermark being detected;
  - operating the detector means to cycle between a sleep interval and an active interval to perform a detection operation for a second watermark at a second location in the media signal relative to a first location of the first watermark in the media signal, the controller means to operate the detector means to cycle between the sleep interval and the active interval in response to the first watermark satisfying the first condition; and
  - searching a buffer of prior detected watermark symbols to detect a third watermark at a third location prior to the second location in the media signal in response to the second watermark not being detected at the second location in the media signal.

11. The apparatus of claim 10, wherein the first watermark includes a first group of symbols and a second group of symbols, the first group of symbols being repeated in the first watermark and the second watermark, the second group of symbols differing between the first watermark and the second watermark, the controller means is to operate the detector means to detect the first group of symbols in the media signal.

12. The apparatus of claim 11, wherein the first watermark satisfies the first condition when the first group of symbols of the first watermark matches a corresponding first group of symbols repeated in a fourth watermark detected in the media signal within a first time period prior to detection of the first watermark.

13. The apparatus of claim 11, wherein the first watermark satisfies the first condition when respective ones of the first group of symbols of the first watermark satisfy respective symbol strength conditions.

14. The apparatus of claim 11, wherein the controller means is to operate the detector means to detect, in the media signal, the first group of symbols repeated in the second watermark.

15. The apparatus of claim 11, wherein the controller means is further to:
- continue to operate the detector means to cycle between sleep intervals and active intervals after a first time period if, during the first time period, at least one of (i) the first group of symbols repeated in the second watermark satisfied a first symbol strength condition or (ii) the first group of symbols repeated in the second watermark matched at least a first number of the corresponding first group of symbols of the first watermark; and
- stop operating the detector means to cycle between the sleep intervals and the active intervals after the first time period if, during the first time period, (iii) the first group of symbols repeated in the second watermark did not satisfy the first symbol strength condition and (iv) the first group of symbols repeated in the second watermark did not match at least the first number of the corresponding first group of symbols of the first watermark.

16. The apparatus of claim 10, wherein the controller means is further to search the buffer of prior detected watermark symbols in response to at least one of: (i) the first watermark being detected or (ii) the second watermark being detected at a location in the media signal different from the second location.

17. The apparatus of claim 10, wherein the sleep interval is a first sleep interval, and wherein the controller means is further to:
- determine whether a second condition is met in response to the first watermark not being detected for a first time period of operating the watermark detector means to search for the first watermark;
- continue to operate the detector means to search for the first watermark if the second condition is met; and
- operate the detector means to sleep for at least one of the first sleep interval or a second sleep interval different from the first sleep interval and then search for the first watermark if the second condition is not met.

* * * * *